United States Patent
Tomita

(10) Patent No.: US 6,784,632 B2
(45) Date of Patent: Aug. 31, 2004

(54) POSITIONING SERVO CONTROLLER

(75) Inventor: Koji Tomita, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 46 days.

(21) Appl. No.: 10/276,156
(22) PCT Filed: May 10, 2001
(86) PCT No.: PCT/JP01/03907
§ 371 (c)(1), (2), (4) Date: Nov. 13, 2002
(87) PCT Pub. No.: WO01/88649
PCT Pub. Date: Nov. 22, 2001

(65) Prior Publication Data
US 2003/0169010 A1 Sep. 11, 2003

(30) Foreign Application Priority Data
May 15, 2000 (JP) .................................. 2000-141868
Jun. 7, 2000 (JP) .................................. 2000-170891

(51) Int. Cl.$^7$ ................................................ G05B 1/06
(52) U.S. Cl. .................... 318/652; 318/560; 318/568.2; 318/568
(58) Field of Search .......................... 701/96; 901/14; 318/652, 560, 568.2, 568

(56) References Cited

U.S. PATENT DOCUMENTS

| | | | | |
|---|---|---|---|---|
| 4,851,748 A | * | 7/1989 | Daggett et al. | 318/568.2 |
| 6,052,252 A | * | 4/2000 | Kim | 360/78.09 |
| 6,249,738 B1 | * | 6/2001 | Higashimata et al. | 701/96 |
| 6,519,109 B1 | * | 2/2003 | Price et al. | 360/78.09 |

FOREIGN PATENT DOCUMENTS

| | | |
|---|---|---|
| EP | 0 417 312 A1 | 3/1991 |
| EP | 1 026 818 A1 | 8/2000 |
| JP | 3-122701 A | 5/1991 |
| JP | 4-100130 A | 4/1992 |
| WO | WO 99/22441 A1 | 5/1999 |

OTHER PUBLICATIONS

International Telecommunication Union; "B–ISDN" Adaptation layer specification Type 2 AAL; Series 1: Integrated Services Digital Network; XP–002243214; 09/97.

* cited by examiner

Primary Examiner—Karen Masih
(74) Attorney, Agent, or Firm—Sughrue Mion, PLLC

(57) ABSTRACT

A positioning servo controller is provided in which optimization of the positioning state can be conducted simply by adjusting an adjustment gain. In a positioning servo controller with: a speed feedforward controlling section (22) which sets a value that is obtained by adding a first feedforward compensation amount to a position deviation, as a speed command; an acceleration feedforward section (23) which sets a value that is obtained by adding a second feedforward compensation amount to a speed deviation, as an acceleration command, the second feedforward compensation amount being obtained by amplifying a differential value of the first feedforward compensation amount; and a torque amplifier (3) in which an acceleration deviation is used as a torque command, and which drives a controlled object on the basis of the torque command, the values of the first feedforward gain and the second feedforward gain are values of functions in which the value of the adjustment gain is used as an argument.

8 Claims, 29 Drawing Sheets

SPEED COMMAND dθr/dt ———
SPEED RESPONSE dθ/dt - - - - - - -

SPEED COMMAND dθr/dt ———
SPEED RESPONSE dθ/dt - - - - - - -

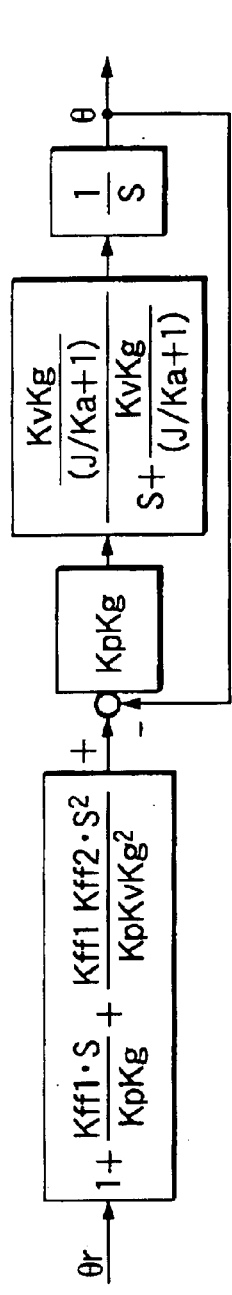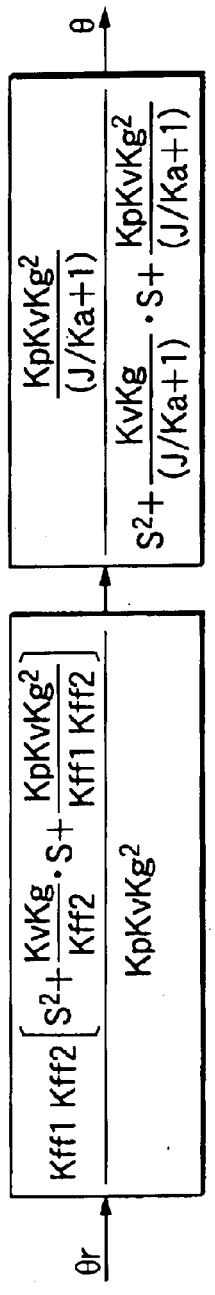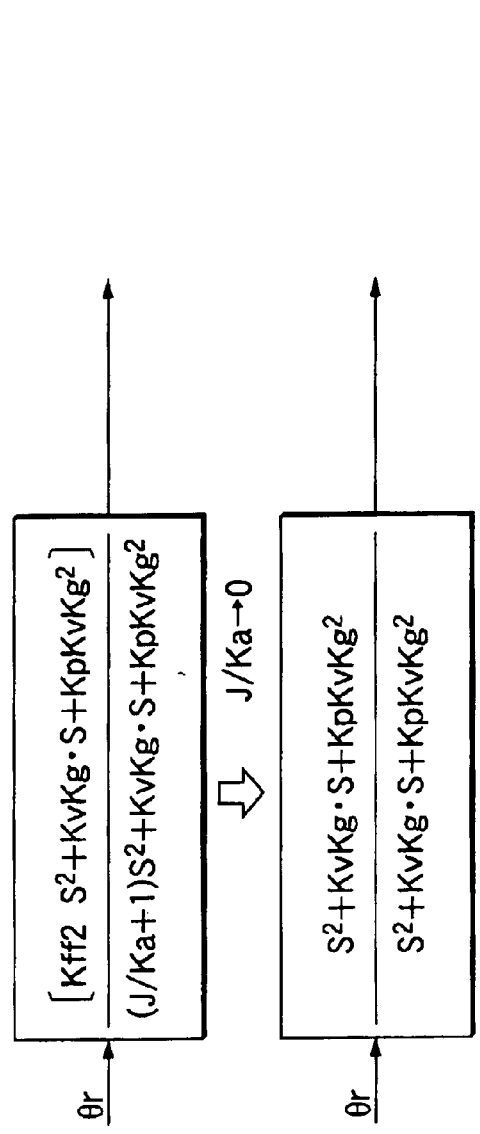
FIG.22A  FIG.22B  FIG.22C  FIG.22D

POSITION FEEDBACK

6,784,632 B2

POSITIONING SERVO CONTROLLER

TECHNICAL FIELD

The present invention relates to a positioning servo controller (position control apparatus) which performs positioning of a controlled object, and more particularly a positioning servo controller for positioning a motor.

BACKGROUND ART

FIG. 30 is a control block diagram showing the configuration of a conventional positioning servo controller. As shown in FIG. 30, the conventional positioning servo controller is configured by a position controller 1, a speed controller 2, a torque amplifier 3, a motor 4, and a differentiator 5.

The positioning servo controller controls the position θ [rad] of the motor 4 in which the inertia is J [N·m·s²].

The motor 4 is provided with an encoder (not shown), so that the position θ of the motor 4 can be detected by the encoder. A position deviation (θr−θ) between a position command θr which is supplied from a higher-level unit (not shown), and the position θ of the motor 4 is input to the position controller 1.

The position controller 1 is a proportional controller which outputs a value obtained by multiplying the deviation with a position loop gain Kp [1/s], as a speed command ωr [rad/s] for the motor 4.

The differentiator 5 differentiates the position θ [rad] of the motor 4, and outputs the speed ω [rad/s] of the motor 4.

The speed controller 2 is a proportional controller which receives a speed deviation between the speed command ωr [rad/s] and the speed ω [rad/s] of the motor 4, and which outputs a value obtained by multiplying the deviation with a speed loop gain Kv [N·m·s], as a torque command Tref [N·m] for the motor 4.

The torque amplifier 3 receives the torque command Tref, and generates a torque Tr to drive the motor 4.

Namely, the positioning servo controller is used for causing the position θ of the motor 4 to follow the position command θr. The position θ of the motor 4 is a position response with respect to the position command θr.

In such a conventional positioning servo controller, the feedback control system in which a positioning control is conducted on the basis of the fed-back position response θ of the motor 4 is used.

As described above, usually, the positioning servo controller has the speed loop process as a minor loop, in the position loop process.

In such a positioning servo controller of the feedback control system, however, the values of the position loop gain Kp and the speed loop gain Kv are finite values and have the upper limit.

Therefore, the position response θ of the motor 4 fails to completely coincide with the position command θr, and so-called servo delay occurs.

FIGS. 31(a) and 31(b) are the graphes showing the operation of the conventional positioning servo controller.

In FIG. 31(a), the position command θr and the position response θ are shown, and, in FIG. 31(b), differentials dθr/dt and dθ/dt of the position command θr and the position response θ are shown.

As shown in FIGS. 31(a) and (b), dθr/dt is a command of accelerating the motor 4 at a constant acceleration, and, after the motor reaches a steady-state speed V [rad/s] and movement at the steady-state speed V is conducted for a predetermined time period, decelerating the motor at a constant acceleration.

In this case, the position deviation is V/Kp [rad] at the maximum, and the time period between a timing when the value of dθr/dt becomes 0 and that when the position response θ actually reaches the value of the position command θr is prolonged in proportion to 1/Kp [s].

FIGS. 31(a) and 31(b) show manners of variations of the commands θr and dθr/dt and the responses θ and dθ/dt in the case where the acceleration/deceleration time=0.1 [s], the steady-state speed V=100 [rad/s], the predetermined time period=0.2 [s], the position loop gain Kp=25 [1/s], the speed loop gain Kv=200 [N·m·s], and the inertia J=1 [N·m·s²].

In FIGS. 31(a) and 31(b), the steady-state deviation is V/Kp=100/25=4 [rad], and the time period between a timing when dθr/dt becomes 0 and that when the value of the position response θ actually reaches that of the position command θr is 0.1 [s].

In such a positioning servo controller, in order to eliminate the above-mentioned servo delay, the feedforward control system is sometimes used together with the feedback control system.

FIG. 32 is a control block diagram showing the configuration of a positioning servo controller in which the feedforward control system is used together with the feedback control system.

The positioning servo controller comprises feedforward controllers 6 and 7 in addition to the components of the positioning servo controller of FIG. 2.

The feedforward controller 6 receives the position command θr, differentiates the position command θr, and outputs a value which is obtained by multiplying the differential value with a first feedforward gain Kff1 [1/s].

The value is a first feedforward controlled variable which is to be added to the speed command ωr [1/s] that is output from the position controller 1.

According to the configuration, in the positioning servo controller of FIG. 32, the speed loop process is conducted on the basis of the speed command which is directly produced from the position command θr, and which does not contain a servo delay element. Therefore, the servo delay can be further eliminated as compared with the case where only the feedback control is used.

The feedforward controller 7 receives a first feedforward compensation amount output from the feedforward controller 6, differentiates the compensation amount, and outputs a value which is obtained by multiplying the differentiation with a second feedforward gain Kff2, as a second feedforward compensation amount.

The second feedforward compensation amount is added to the value output from the speed controller 2, and the result of the addition is input as the torque command Tr to the torque amplifier 3.

According to the configuration, the torque amplifier 3 can drive the motor 4 on the basis of the torque command Tr which does not contain a servo delay element.

As described above, in the positioning servo controller of FIG. 32, servo delay which may be generated by the feedback control can be compensated by conducting the speed feedforward control and the torque feedforward control.

FIG. 33 is a control block diagram showing the blocks of the positioning servo controller of FIG. 32 in a simplified manner. As shown in FIG. 33, the control performance of the positioning servo controller depends on the values of the feedforward gains Kff1 and Kff2.

In the positioning servo controller of FIG. 32, therefore, the motor 4 is controlled in a state where the feedforward gains Kff1 and Kff2 are set to optimum values so that servo delay is reduced to a degree as small as possible.

When the feedforward gain Kff1=1, the control block diagram of the positioning servo controller is as shown in FIG. 34.

When the feedforward gain Kff2=J, the transfer function G from the position command θr to the position response θ has a value of 1, and ideally no delay occurs between the position command θr and the position response θ, so that servo delay of the positioning servo controller is 0.

In practice, however, it is often that physical quantities such as the inertia J of the motor 4 which is the controlled object are not completely grasped, and it is difficult to set the values of the feedforward gains Kff1 and Kff2 to optimum values.

In such a case, during a process of positioning the motor 4, a phenomenon such as an overshoot or an undershoot occurs. When Kff2=J, for example, servo delay of the positioning servo controller is 0. In the case where the value of J is unknown, however, the value of the feedforward gain Kff2 cannot be set to that of J, and hence an overshoot or an undershoot occurs in the response.

FIGS. 35(a) and 35(b) show manners of variations of the speed response dθ/dt which is a differential of the position response θ of the positioning servo controller in the case where the value of the feedforward gain Kff2 is not optimumly set.

In FIGS. 35(a) and 35(b), Kff2=0.5=J/2.

FIG. 35(b) is an enlarged view of the portion A in FIG. 35(a).

As shown in FIG. 35(b), an overshoot occurs in the speed response dθ/dt.

In order to eliminate such an overshoot, a countermeasure such as that the value of the feedforward gain Kff1 is reduced, or that a filter is disposed in the output of the feedforward controller 7 has been taken. However, the conventional positioning servo controller has a problem in that servo delay is again produced by such a countermeasure.

Returning to FIG. 30, the conventional positioning servo controller is configured by the position controller 1, the speed controller 2, the torque amplifier 3, the motor 4, and the differentiator 5. The conventional positioning servo controller controls the position θ [rad] of the motor 4 in which the inertia is J [N·m·s²].

For the sake of simplicity of description, it is assumed that the controlled object is a rigid body and the total inertia of the controlled object and the motor 4 is J, and also that the response of the torque amplifier 3 is so fast as to be negligible.

As described above, in the positioning servo controller, usually, a speed loop having the speed loop gain Kv is disposed as a minor loop in the position loop process. The torque amplifier 3 which generates a torque is disposed in the speed loop. The motor of the inertia J is rotated by the generated torque Tr. The position θ is read into the controller by the encoder to be used in the control. In such a conventional positioning servo controller, a machine is coupled to the end of the motor, and it is important to adjust the values of Kp and Kv in a well-balanced manner in accordance with the characteristics of the machine and the operation requirement use.

As shown in FIG. 36, the response characteristic in the case where a step command is input to the control system of FIG. 30 is variously changed depending on the combination of the values of Kp and Kv.

In FIG. 36, three kinds of lines, or lines (a) to (c) are drawn. The lines respectively show response characteristics in the following manner:

(1) (a) shows the case where Kv=50 and Kp=10,
(2) (b) shows the case where Kv=100 and Kp=25, and
(3) (c) shows the case where Kv=50 and Kp=50.

It is assumed that J=1 in all the cases.

For example, the case will be considered in which the requested specification is that, as shown in the line (b) of FIG. 36, an overshoot does not occur and a high response is attained, and the initial state is the state of the line (a) of FIG. 36. When adjustment is to be conducted in accordance with the request, the value of Kp is first gradually increased while monitoring the waveform of the position feedback, and, when the state of the line (c) of FIG. 36 is attained, the value of Kv is then gradually increased. As a result, the state of the line (b) of FIG. 36 is obtained.

In a usual case, when Kv is excessively increased, however, the servo system oscillates because of the mechanical system which is neglected in the above, and delay of the torque amplifier 3 disposed in the speed loop.

When oscillation occurs during the course of increasing Kv, therefore, the value of Kp must be again reduced, and an optimum value of Kv must be then searched.

As described above, in the conventional positioning servo controller, it is required to adjust an optimum gain while alternatingly changing the values of Kp and Kv. Unless the relationship between Kp and Kv is fully known, it is difficult to perform the adjustment in a well-balanced manner.

Specifically, a skilled person knows that the controlled object in the configuration of FIG. 6 is a rigid body, and, when the total load inertia of the motor and the machine is J, the state of the line (b) of FIG. 36 can be obtained by setting Kv=4·Kp·J. However, it is difficult for a person who has little experience and knowledge to achieve the balance.

FIG. 37 is a control block diagram showing another conventional positioning servo controller which is slightly different in configuration from the conventional positioning servo controller of FIG. 30. As shown in FIG. 37, the conventional positioning servo controller is configured by a position controller 1, a speed controller 2, a motor 4, and a differentiator 5.

The conventional positioning servo controller controls the position θ [rad] of the motor 4 in which the inertia is J [N·m·s²].

Usually, a torque amplifier which receives a produced torque command and generates a torque to drive the motor 4 is disposed. However, it is assumed that the response of the torque amplifier is so fast as to be negligible, and hence the torque amplifier is not shown in the figure.

For the sake of simplicity of description, it is assumed that the controlled object is a rigid body and the total inertia of the controlled object and the motor 4 is J.

The motor 4 is provided with an encoder (not shown), so that the position θ of the motor 4 can be detected by the encoder. A position deviation between a position command θr which is supplied from a host apparatus (not shown), and the position θ of the motor 4 is input to the position controller 1 and the differentiator 5.

The position controller 1 is a proportional controller which outputs a value obtained by multiplying the deviation with a proportional gain Kp [N·m·s²].

The differentiator 5 outputs a value which is obtained by differentiating the position deviation between the position command θr and the position θ of the motor 4.

The speed controller 2 is a proportional controller which outputs a value obtained by multiplying the value obtained by the differentiator 5, with a differential gain Kd [1/s] The conventional positioning servo controller is used for causing the position θ of the motor 4 to follow the position command θr. The position θ of the motor 4 is a position response with respect to the position command θr.

The torque for controlling the motor 4 in the conventional positioning servo controller is produced by the torque amplifier which is not shown, by using as the torque command a value obtained by adding together the values output from the position controller 1 and the speed controller 2.

FIG. 38 shows another conventional positioning servo controller which further comprises an integrator 6 and an integration controller 3 in addition to the conventional positioning servo controller shown in FIG. 37.

The integrator 6 integrates the position deviation between the position command θr and the position of the motor 4, and outputs the value of the integration. The integration controller 3 amplifies the value obtained by the integrator 3 by an integral gain Ki, and outputs the amplified value.

The torque for controlling the motor 4 in the conventional positioning servo controller is produced by the torque amplifier which is not shown, by using as the torque command a value obtained by adding together the values output from the position controller 1, the speed controller 2, and the integration controller 3.

In the conventional positioning servo controllers shown in FIGS. 37 and 38, in order to enable the response of θ with respect to the position command θr, that of θ with respect to a disturbance Td, and the like to exert a desired performance, it is necessary to adjust the values of the gains Kp, Kd, and Ki to optimum values.

In the case where the controlled object (the total of the actuator and the machine coupled to the actuator) is an ideal rigid body, the adjustment can be easily obtained according to a control theory. In an actual controlled object, however, friction and spring elements exist, and hence the adjustment is usually conducted by cut and try.

Therefore, the parameter adjustment is a cumbersome work.

FIGS. 39 and 40 show conventional positioning servo controllers for solving the problem.

In FIG. 39, amplifiers 27 and 28 are added to the conventional positioning servo controller shown in FIG. 37, and, in FIG. 40, amplifiers 27, 28, and 29 are added to the conventional positioning servo controller shown in FIG. 38.

The amplifier 27 amplifies the value output from the position controller 1 by a value Kg$^2$ which is obtained by squaring an adjustment gain Kg, and outputs the amplified value.

The amplifier 28 amplifies the value output from the speed controller 8 by the adjustment gain Kg, and outputs the amplified value.

The amplifier 29 amplifies the value output from the integration controller 3 by a value Kg3 which is obtained by cubing the adjustment gain Kg, and outputs the amplified value.

In the conventional positioning servo controller, the parameter Kg for simultaneously changing a proportional element, a differential element, and an integral element is introduced, and, when the proportional gain Kp, the differential gain Kd, and the integral gain Ki are once determined, the gain adjustment can be conducted while achieving the balance, simply by changing the adjustment gain Kg which is one parameter. Therefore, it is possible to easily realize a requested response characteristic.

In the conventional positioning servo controllers shown in FIGS. 39 and 40, however, there arises a problem in the case where the disturbance response is taken into consideration.

In the conventional positioning servo controller shown in FIG. 40, for example, the command response which is a response of a position deviation θ1 with respect to the position command θr, and the disturbance response which is a response of a position deviation θ2 with respect to the disturbance Td are calculated as shown in FIG. 41.

In this control system, even when Kp, Kd, Ki, and Kg are adjusted so as to reduce the position deviation θ2 caused by the influence of the disturbance Td, also the position deviation θ1 in the command response is changed together with the position deviation θ2 in the disturbance response because also the transfer function from the position command θr to the position deviation θ1 depends on only the same parameters.

Namely, such a configuration is a so-called one-degree of freedom control system, and hence the adjustment cannot be adequately conducted by using only the adjustment gain Kg on the feedback side.

As a method of eliminating servo delay, there is a method in which, as in a positioning servo controller which is shown in FIG. 1 and described later, a speed feedforward controller 6, an acceleration feedforward controller 7, and an acceleration controller 8 that performs an acceleration feedback control on the basis of the deviation between the acceleration of the motor 4 and an acceleration command to output the torque command to the torque amplifier 3 are added.

On the other hand, as a method in which optimum adjustment of the positioning state of the position response θ is easily conducted by adjusting various parameters of the control system such as the position loop gain Kp and the speed loop gain Kv, there is a method in which, as in a positioning servo controller which is shown in FIG. 5 and described later, an amplifier 10 that multiplies an input with the adjustment gain Kg is disposed behind the position controller 1 and the speed controller 2.

In such a positioning servo controller, however, the adjustment gain and the feedforward gain are adjusted by try and error to conduct optimum adjustment of the positioning state, and hence there is a problem in that the adjustment requires a prolonged time period.

As described above, in the conventional positioning servo controller shown in FIG. 30, when physical quantities of the motor which affect the control are unknown, the values of control parameters such as a feedforward gain cannot be set to optimum values, thereby producing a problem in that an overshoot or an undershoot occurs in a control response and a satisfactory control response cannot be obtained.

It is a first object of the invention to provide a positioning servo controller in which, even when physical quantities of a motor are unknown, a satisfactory control response can be obtained.

In the conventional positioning servo controller described above, the two parameters must be adjusted, and hence there is a problem in that it is difficult to easily realize a requested response characteristic.

It is a second object of the invention to provide a positioning servo controller in which a requested response characteristic can be easily realized.

The conventional positioning servo controller of FIG. 37 described above has a problem in that, even when the adjustment gain is used in order to adjust the gain of the feedback control system by one parameter, it is difficult to easily realize a requested response characteristic in the case of adjustment of the disturbance response.

It is a third object of the invention to provide a positioning servo controller in which a requested response characteristic can be easily realized even in the case of adjustment of the disturbance response.

It is a fourth object of the invention to provide a positioning servo controller in which optimum adjustment of the positioning state can be easily conducted.

DISCLOSURE OF THE INVENTION

In order to attain the first object, a positioning servo controller according to an embodiment of a first invention comprises: a position controlling section which amplifies a position deviation between a position command issued from a higher-level unit and a position of a controlled object by a position loop gain, and which outputs the amplified deviation; a speed feedforward section which sets a value that is obtained by adding a first feedforward compensation amount to the value output from the position controlling section, as a speed command, the first feedforward compensation amount being obtained by amplifying a differential value of the position command by a first feedforward gain; a speed controlling section which amplifies a speed deviation between the speed command and a speed of the controlled object by a speed loop gain, and which outputs the amplified deviation; an acceleration feedforward section which sets a value that is obtained by adding a second feedforward compensation amount to the value output from the speed controlling section, as an acceleration command, the second feedforward compensation amount being obtained by amplifying a differential value of the first feedforward compensation amount by a second feedforward gain; an acceleration controlling section which amplifies an acceleration deviation between the acceleration command and an acceleration of the controlled object by an acceleration loop gain, and which outputs the amplified deviation as a torque command; and a torque amplifier which drives the controlled object on the basis of the torque command.

As described above, the positioning servo controller of the embodiment comprises the acceleration controlling section which outputs the value obtained by amplifying the acceleration deviation between the acceleration command and the acceleration of the controlled object by the acceleration loop gain, as the torque command. Even when a physical quantity of the controlled object contained in a coefficient of a transfer function in which the position command is an input and the position response is an output is unknown, therefore, the value of the acceleration loop gain in the coefficient is a denominator of the physical quantity of the controlled object, and an influence of the value of the physical quantity of the controlled object on the position response can be made negligible by setting the value of the acceleration loop gain to an adequate one. Consequently, a satisfactory control response can be obtained by setting the acceleration loop gain to an adequate value.

In order to attain the second object, a positioning servo controller according to an embodiment of a second invention comprises: a position controlling section which amplifies a position deviation between a position command issued from a higher-level unit and a position of a controlled object by a position loop gain, and which outputs the amplified deviation; a first amplifying section which amplifies the value output from the position controlling section by an adjustment gain, and which outputs the amplified value as a speed command; a differentiating section which differentiates the position of the controlled object to obtain a speed of the controlled object; a speed controlling section which amplifies a speed deviation between the speed command and the speed of the controlled object obtained by the differentiating section, by a speed loop gain, and which outputs the amplified deviation; a second amplifying section which amplifies the value output from the speed controlling section by the adjustment gain, and which outputs the amplified value as a torque command; and a torque amplifier which drives the controlled object on the basis of the torque command.

As described above, in the positioning servo controller of the embodiment, when the speed loop gain and the position loop gain are once set to determine the amount of overshoot, only the time direction is changed by the adjustment gain. Therefore, it is possible to easily realize a requested response characteristic.

Another positioning servo controller according to another embodiment comprises: a position controlling section which amplifies a position deviation between a position command issued from a higher-level unit and a position of a controlled object by a position loop gain, and which outputs the amplified deviation; a first amplifying section which amplifies the value output from the position controlling section by an adjustment gain, and which outputs the amplified value as a speed command; a differentiating section which differentiates the position of the controlled object to obtain a speed of the controlled object; an integrating section which integrates a speed deviation between the speed command and the speed of the controlled object that is obtained by the differentiating section, and which outputs a value that is obtained by multiplying an integral value with a speed loop integral gain; a second amplifying section which amplifies the value output from the integrating section by the adjustment gain, and which outputs the amplified value; a speed controlling section which amplifies a value that is obtained by adding the value output from the second amplifying section to a speed deviation between the speed command and the speed of the controlled object obtained by the differentiating section, by a speed loop gain, and which outputs the amplified deviation; a third amplifying section which amplifies the value output from the speed controlling section by the adjustment gain, and which outputs the amplified value as a torque command; and a torque amplifier which drives the controlled object on the basis of the torque command.

In the positioning servo controller, the invention is applied to a positioning servo controller in which the position is controlled by the P (Proportional) control and the speed is controlled by the P-I (Proportional-Integral) control.

A positioning servo controller of a further embodiment comprises: a position controlling section which amplifies a position deviation between a position command issued from a higher-level unit and a position of a controlled object by a position loop gain, and which outputs the amplified deviation; a first amplifying section which amplifies the value output from the position controlling section by an adjustment gain, and which outputs the amplified value as a speed command; a differentiating section which differentiates the position of the controlled object to obtain a speed of the controlled object; an integrating section which integrates a speed deviation between the speed command and the speed of the controlled object that is obtained by the differentiating section, and which outputs a value that is obtained by multiplying an integral value with a speed loop integral gain; a second amplifying section which amplifies the value output from the integrating section by the adjustment gain, and which outputs the amplified value; a speed controlling section which amplifies a deviation between the value output from the second amplifying section and the speed of the controlled object by a speed loop gain, and which outputs the amplified deviation; a third amplifying section which amplifies the value output from the speed controlling section by the adjustment gain, and which outputs the amplified value as a torque command; and a torque amplifier which drives the controlled object on the basis of the torque command.

In the positioning servo controller, the invention is applied to a positioning servo controller in which the position is controlled by the P (Proportional) control and the speed is controlled by the I-P (Integral-Proportional) control.

In order to attain the third object, a positioning servo controller according to an embodiment of a third invention comprises: a position controlling section which amplifies a position deviation between a position command issued from a higher-level unit and a position of a controlled object, by a proportional gain, and which outputs the amplified deviation; a first amplifying section which amplifies the value output from the position controlling section by a value that is obtained by squaring an adjustment gain, and which outputs the amplified value; a differentiating section which differentiates the position deviation between the position command and the controlled object; a speed controlling section which amplifies a value obtained by the differentiating section, by a differential gain, and which outputs the amplified value; a second amplifying section which amplifies the value output from the speed controlling section by the adjustment gain, and which outputs the amplified value; a feedforward controlling section which outputs a value that is obtained by adding a value obtained by amplifying a value obtained by second-order differentiation of the position command, by a first feedforward gain, to a value obtained by amplifying a value obtained by differentiating the position command, by a second feedforward gain and the adjustment gain; and a torque amplifier which sets a value obtained by adding together the values output from the first and second amplifying sections and the feedforward section, as a torque command, and which drives the controlled object on the basis of the torque command.

As described above, according to the third invention, the feedforward controlling section is disposed to set the control system as a two-degree of freedom system, and the gain of the feedforward controlling section and that of the feedback system can be adjusted by the adjustment gain which is one parameter. Therefore, the gain adjustment for determining the requested response characteristic can be simplified.

In another embodiment, in addition to the above configuration, the controller may further comprise: an integrating section which integrates the position deviation between the position command and the position of the controlled object; an integration controlling section which amplifies a value obtained by the integrating section, by an integral gain, and which outputs the amplified value; and a third amplifying section which amplifies the value output from the integration controlling section, by a value that is obtained by cubing the adjustment gain, and which outputs the amplified value.

In a further embodiment, in addition to the above configuration, the controller may further comprise: a second-order differentiating section which performs second-order differentiation on the position deviation between the position command and the controlled object; and an acceleration controlling section which amplifies a value obtained by the second-order differentiating section, by an acceleration gain, and which outputs the amplified value.

In order to attain the fourth object, an embodiment of a fourth invention comprises: a position controlling section which amplifies a position deviation between a position command issued from a higher-level unit and a position of a controlled object, by a position loop gain, and which outputs the amplified deviation; a first amplifying section which amplifies the value output from the position controlling section by an adjustment gain, and which outputs the amplified value; a speed feedforward controlling section which sets a value that is obtained by adding a first feedforward compensation amount to the value output from the first amplifying section, as a speed command, the first feedforward compensation amount being obtained by amplifying a differential value of the position command by a first feedforward gain; a speed controlling section which amplifies a speed deviation between the speed command and a speed of the controlled object by a speed loop gain, and which outputs the amplified deviation; a second amplifying section which amplifies the value output from the speed controlling section by the adjustment gain, and which outputs the amplified value; an acceleration feedforward section which sets a value that is obtained by adding a second feedforward compensation amount to the value output from the second amplifying section, as an acceleration command, the second feedforward compensation amount being obtained by amplifying a differential value of the first feedforward compensation amount by a second feedforward gain; an acceleration controlling section which amplifies an acceleration deviation between the acceleration command and an acceleration of the controlled object by an acceleration loop gain, and which outputs the amplified deviation as a torque command; and a torque amplifier which drives the controlled object on the basis of the torque command, values of the first feedforward gain and the second feedforward gain being values of functions in which a value of the adjustment gain is used as an argument.

In the positioning servo controller of the fourth invention, the values of the first feedforward gain and the second feedforward gain are those of functions in which the adjustment gain is used as an argument, thereby enabling optimization of the positioning state to be conducted simply by adjusting the adjustment gain. Therefore, optimum adjustment of the positioning state can be easily conducted.

BRIEF DESCRIPTION OF THE DRAWINGS

FIGS. 22($a$) to 22($d$) is an equivalent block diagram of the control block diagram of FIG. 21.

Figure 1:
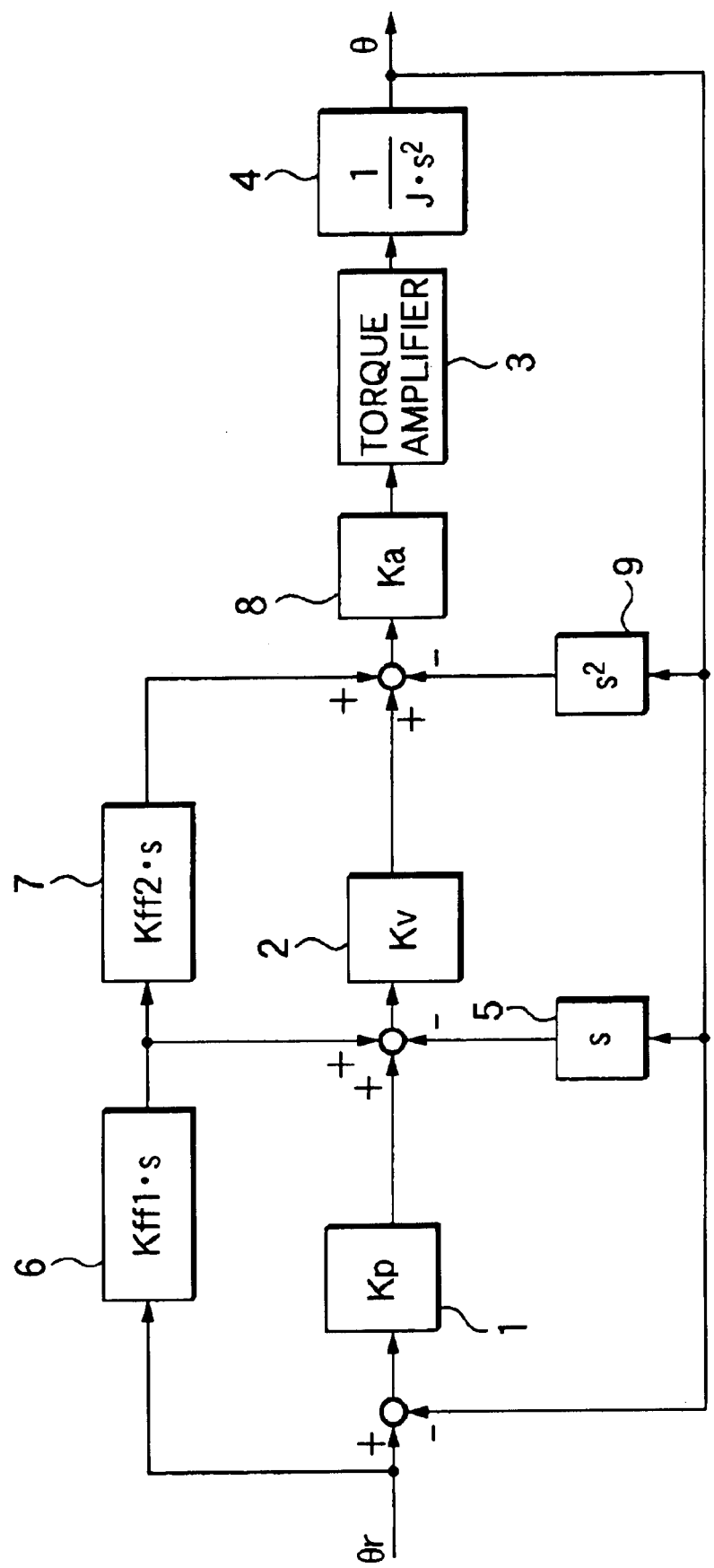
FIG. 1 is a control block diagram showing the configuration of a positioning servo controller of a first embodiment.

In the figures, the reference numeral 1 denotes a position controller, 2 denotes a speed controller, 3 denotes a torque amplifier, 4 denotes a motor, 5 and 9 denote differentiators, 6, 7, 10, 11, 22, and 23 denote feedforward controllers, 8 denotes an acceleration controller, 12 denotes a second-order differentiator, 13 denotes an acceleration controller, 16 denotes an integrator, 17 denotes a differentiator, 27, 28, and 29 denote amplifiers, and 30 denotes a controlled object.

BEST MODE FOR CARRYING OUT THE INVENTION

Next, embodiments of the inventions will be described with reference to the drawings.

In all the figures, all components which are denoted by the same reference numeral indicate the identical member.

(Embodiment 1)

First, a positioning servo controller of Embodiment 1 of the invention which attains the first object will be described in detail with reference to FIGS. 1 to 4.

Figure 32:
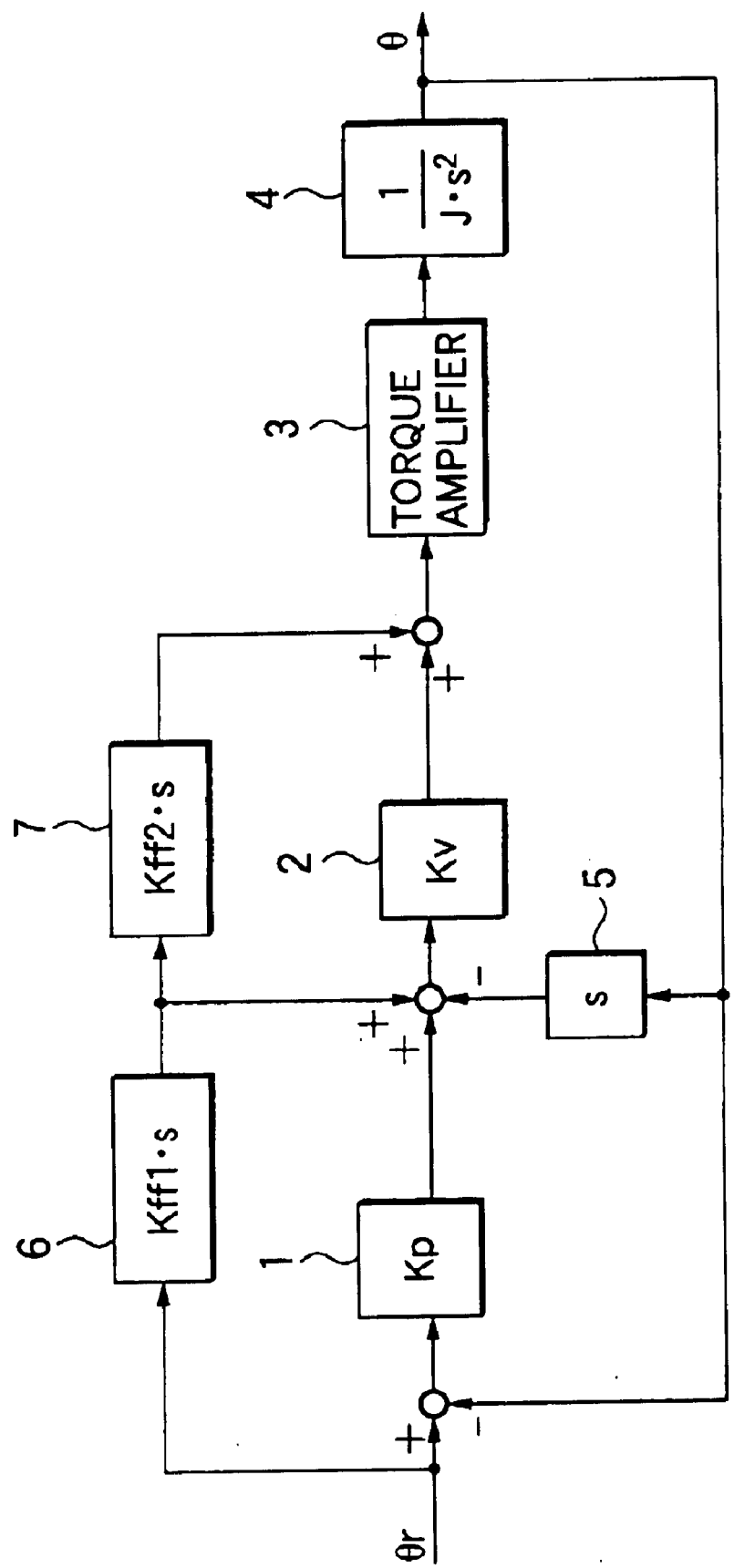
FIG. 32 is a control block diagram showing the configuration of a positioning servo controller in which the feedforward control system is used together with the feedback control system.
Figure 33:
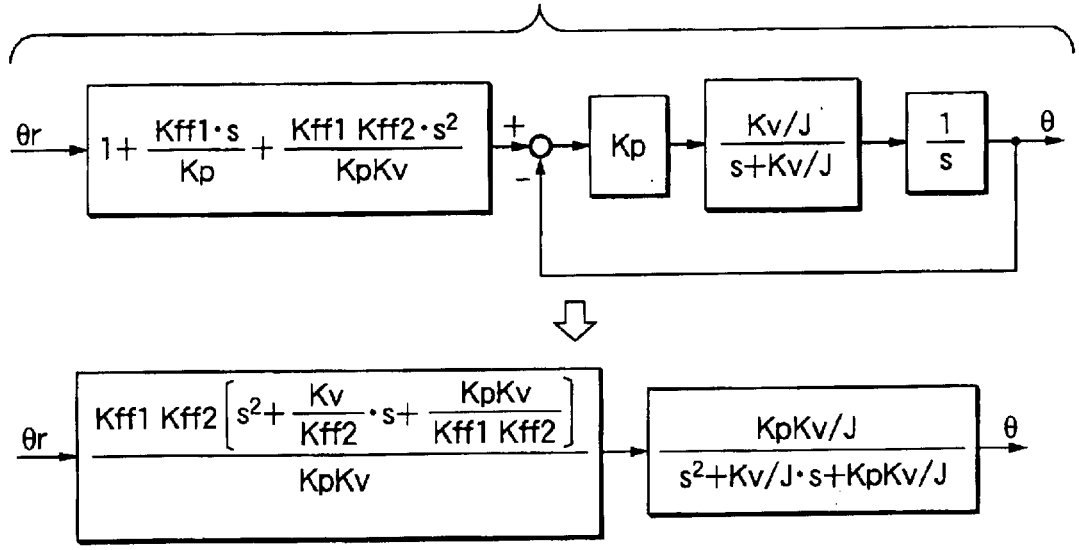
FIG. 33 is a simplified control block diagram of the control block diagram of FIG. 32.

FIG. 1 is a control block diagram showing the configuration of a positioning servo controller of the one embodiment. The positioning servo controller of the embodiment is different from the conventional positioning servo controller of FIG. 32, in that the controller comprises an acceleration controller 8 and a differentiator 9.

The differentiator 9 performs second-order differentiation on the position response θ of the motor 4 to output the acceleration of the motor 4. The acceleration controller 8 is a proportional controller which receives an acceleration deviation between the value that is obtained by adding together the value output from the speed controller 2 and that output from the feedforward controller 7, and the acceleration of the motor 4 that is output from the differentiator 9, and which outputs a value that is obtained by multiplying the acceleration deviation with an acceleration loop gain Ka, as the torque command Tr to the torque amplifier 3.

Figure 2:
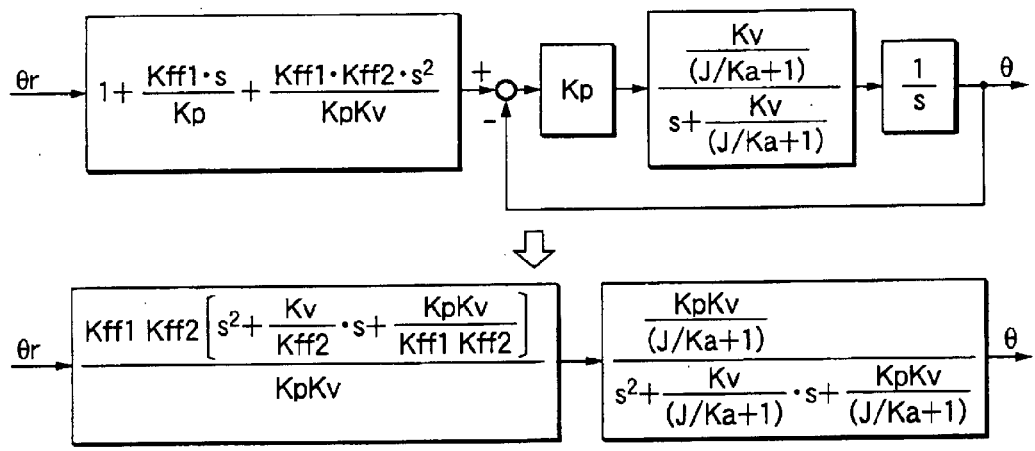
FIG. 2 is a simplified control block diagram of the control block diagram of FIG. 1.

FIG. 2 shows a simplified diagram of the control block diagram of FIG. 1.

In order to further simplify the control block diagram of FIG. 2, it is assumed that the feedforward gain Kff1=1. Then, the control block diagram of FIG. 2 is simplified as shown in a control block diagram of FIG. 3.

Figure 3:
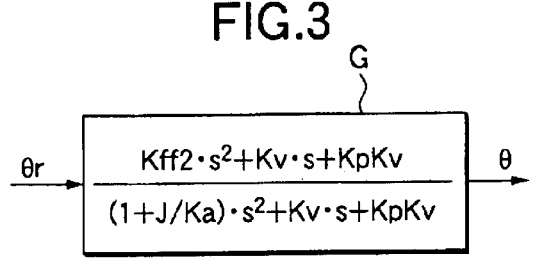
FIG. 3 is a simplified control block diagram of the control block diagram of FIG. 2.
Figure 34:
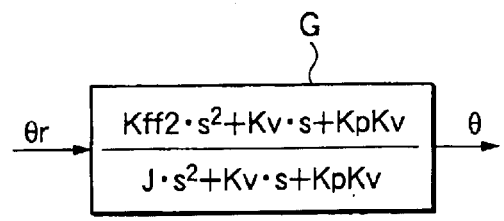
FIG. 34 is a simplified control block diagram of the control block diagram of FIG. 33.

When the control block diagram of FIG. 3 is compared with that of FIG. 34, the coefficient of the term of $S^2$ in the denominator is J in the control block diagram of FIG. 34, and by contrast it is 1+J/Ka in the control block diagram of FIG. 3.

In the transfer function G, the value of the acceleration loop gain Ka is the denominator of the inertia J of the motor 4. As the value of the acceleration loop gain Ka is larger, therefore, J/Ka becomes nearer to 0.

Namely, even when the value of the inertia J is not clearly known, the influence of the inertia J on the position response θ can be reduced by setting the value of the acceleration loop gain Ka to an adequate one.

In the control block diagram of FIG. 3, when the feedforward gain Kff2=1, the transfer function G between the position command θr and the position response θ can be made substantially equal to 1, so that the delay of the position response θ with respect to the position command θr can be eliminated.

Figure 4A:
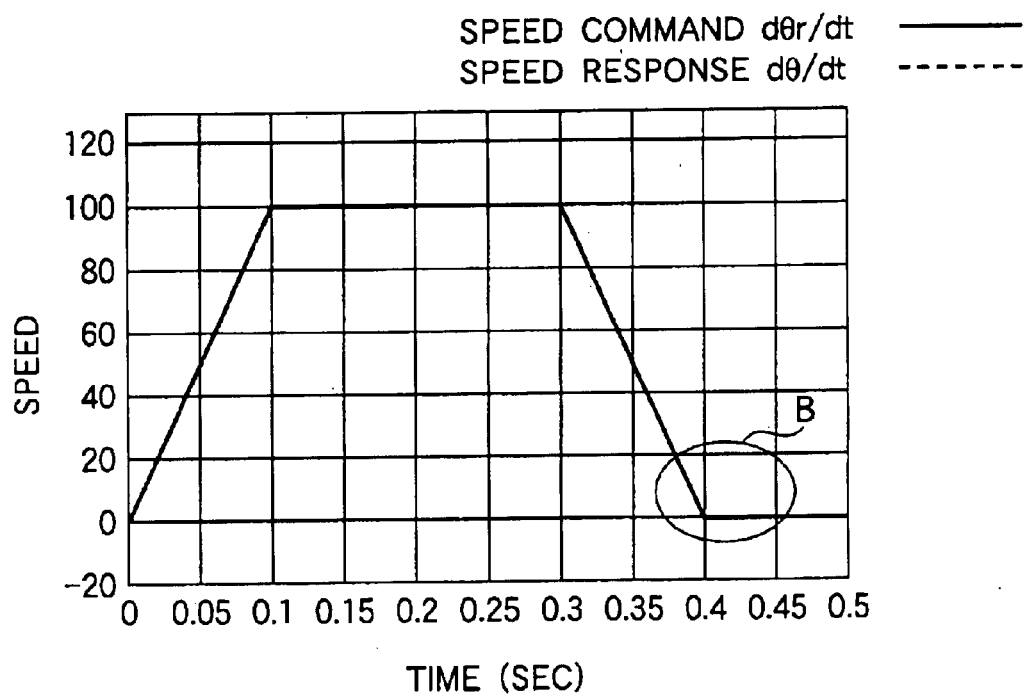
FIGS. 4(a) and 4(b) are graphs showing the operation of a positioning servo controller of an embodiment of the invention.
Figure 4B:
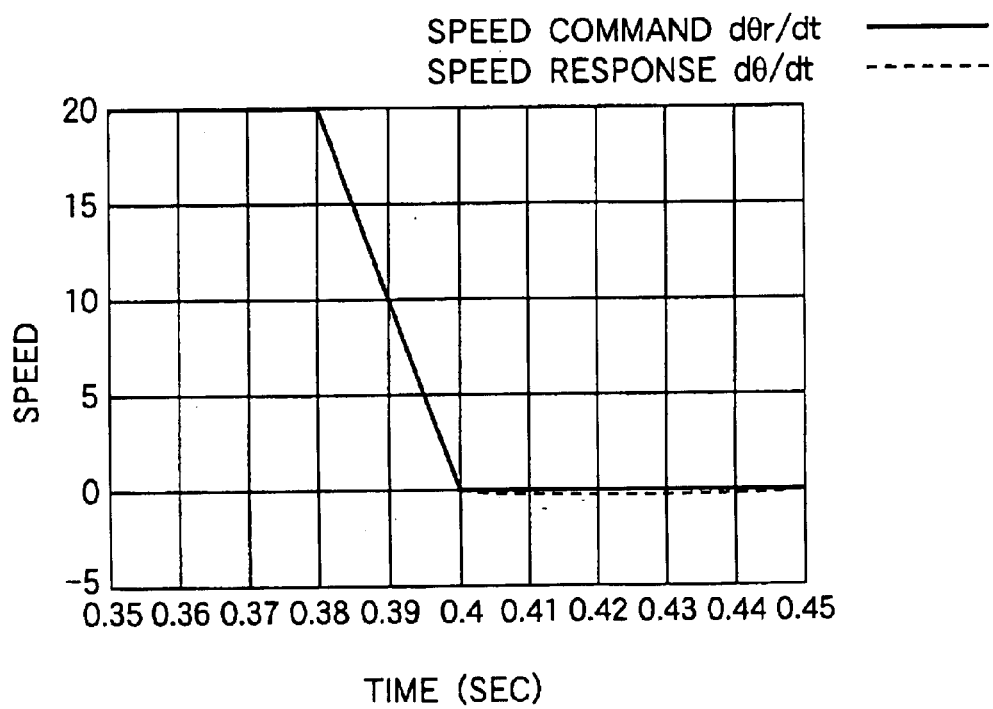

FIGS. 4(a) and 4(b) are the graphes showing the operation of the positioning servo controller of the embodiment in the case where Kp=25 [1/s], Kv=200 [1/s], Ka=10, Kff1=1 [1/s], and Kff2=1 [1/s].

FIGS. 4(a) and 4(b) show manners of variations of differentials dθ/dt and dθ/dt of the position command θr and the position response θ.

Figure 35A:
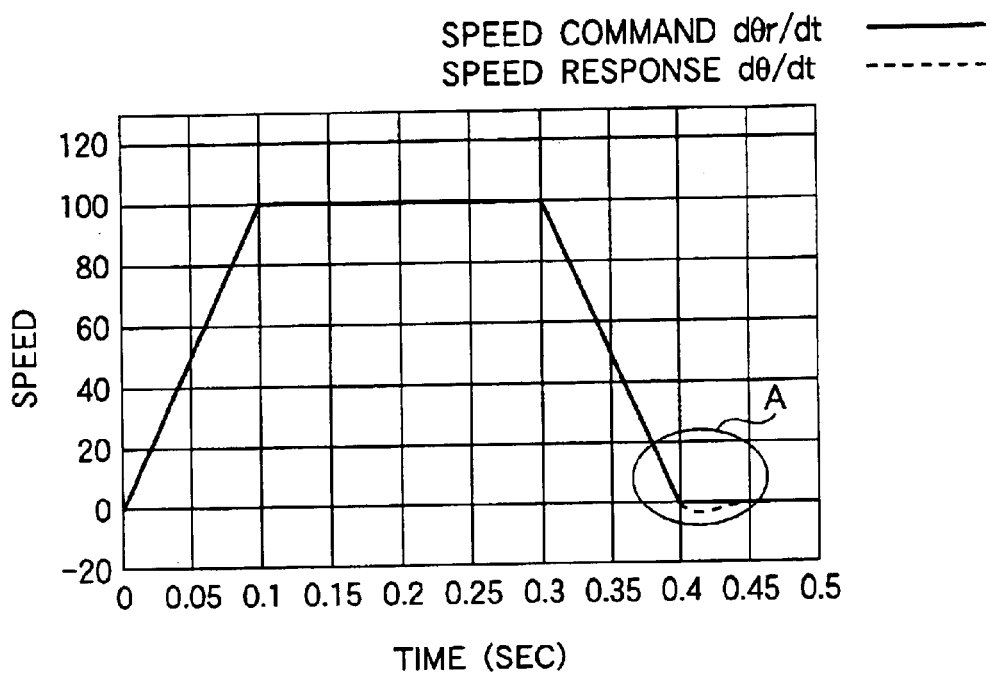
FIGS. 35($a$) and 35($b$) show the graphs for the operation of the conventional positioning servo controller.
Figure 35B:
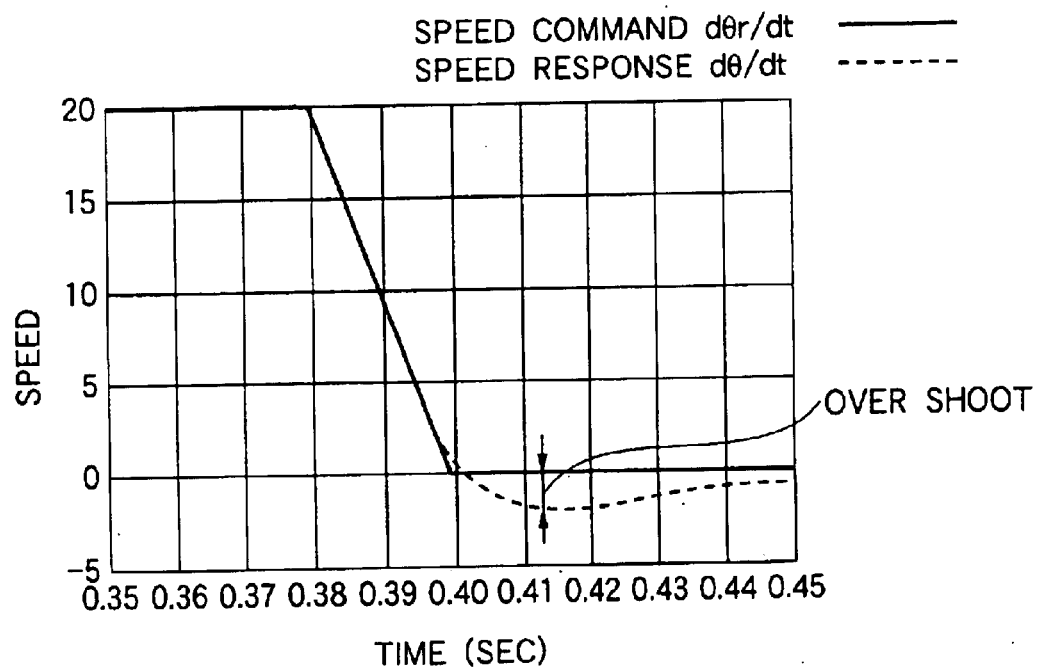

The waveform of dθr/dt in FIGS. 4(a) and 4(b) is identical with that of dθr/dt in FIGS. 35(a) and 35(b).

In FIGS. 4(a) and 4(b), it is assumed that also the values of the acceleration/deceleration time, the steady-state speed, the predetermined time period, the position loop gain Kp, the speed loop gain Kv, and the inertia J are equal to those in FIGS. 35(a) and 35(b), and the acceleration loop gain Ka=10 and the feedforward gains Kff1=1 and Kff2=1.

When FIG. 4(b) which is an enlarged view of the portion B in FIG. 4(a) is compared with FIG. 35(b), it will be seen that the amount of overshoot of the speed response dθ/dt is reduced.

As described above, the positioning servo controller of the embodiment comprises the acceleration controller 8 which outputs a value that is obtained by amplifying the acceleration deviation between the acceleration command and the acceleration of the motor 4 by an acceleration loop gain Ka, as the torque command.

According to the configuration, in the positioning servo controller of the embodiment, even when the inertia J of the motor 4 contained in the coefficient of the transfer function G in which the position command θr is an input and the position response θ is an output is unknown, the acceleration loop gain Ka is the denominator of the inertia J of the motor 4 in the coefficient of the transfer function G, and hence an influence of the inertia J of the motor 4 on the position response θ can be made negligible by setting the value of the acceleration loop gain Ka to an adequate one.

In the positioning servo controller of the embodiment, therefore, a satisfactory control response can be obtained.

In the positioning servo controller of the embodiment, even when the value of the inertia J of the motor 4 is changed, the influence of the inertia J of the motor 4 on the position response θ can be made negligible by setting the value of the acceleration loop gain Ka to an adequate one. Therefore, a satisfactory control response can be obtained.

In the positioning servo controller of the embodiment, when the value of the inertia J is clearly known, the transfer function G=1 can be attained by setting $Kff2=1+J/Ka$.

Consequently, the positioning servo controller of the embodiment can optimumly position the motor 4 irrespective of whether the value of the inertia J is clearly known or not.

As described above, the positioning servo controller of the invention comprises the acceleration controller which outputs the value that is obtained by amplifying the acceleration deviation between the acceleration command and the actual acceleration of the motor by the acceleration loop gain, as the torque command. Even when the inertia of the motor contained in the coefficient of the transfer function in which the position command is an input and the position response is an output is unknown, therefore, the value of the acceleration loop gain in the transfer function is a denominator of the inertia of the motor.

Consequently, an influence of the inertia of the motor on the position response can be made negligible by setting the value of the acceleration loop gain to an adequate one. In the positioning servo controller of the invention, therefore, a satisfactory control response can be obtained.

(Embodiment 2)

Next, Embodiment 2 of the invention which attains the second object will be described in detail with reference to FIGS. 5 to 9.

(Embodiment 2-1)

Figure 5:
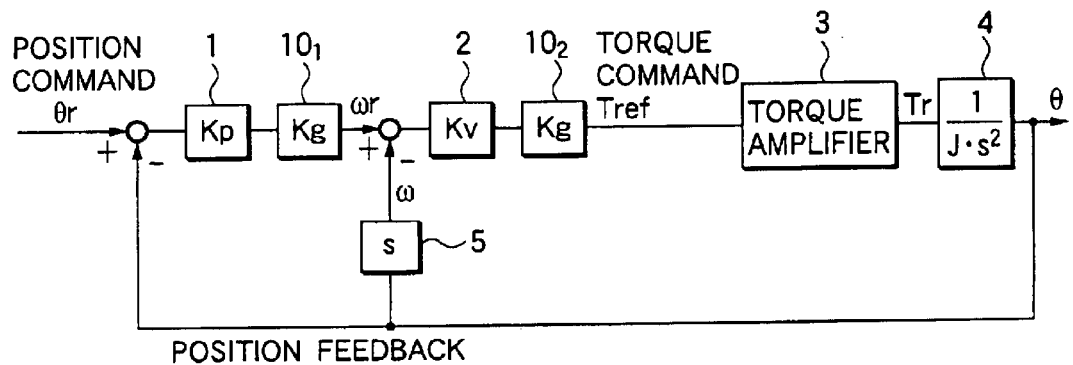
FIG. 5 is a block diagram showing the configuration of a first positioning servo controller of a second embodiment.

FIG. 5 is a block diagram showing the configuration of a positioning servo controller of Embodiment 2-1.

Figure 6:
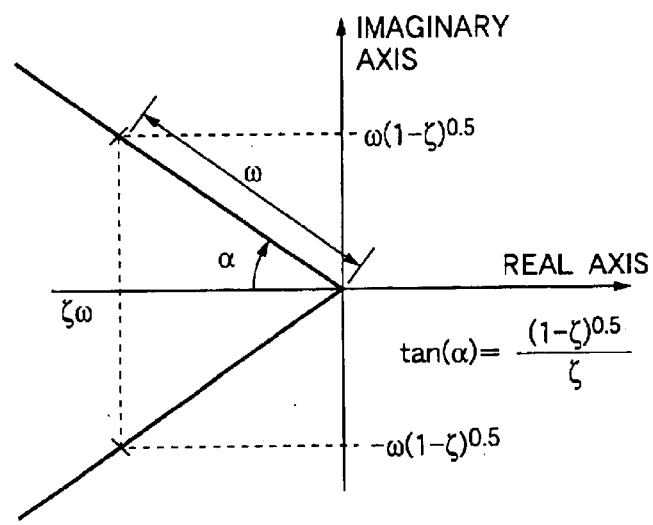
FIG. 6 is a pole map illustrating the operation of the positioning servo controller of FIG. 5.

In FIG. 5, components identical with those of FIG. 6 are denoted by the same reference numerals, and their description is omitted.

The positioning servo controller of the embodiment is configured so that, in the conventional positioning servo controller shown in FIG. 6, amplifiers 101 and 102 are disposed behind the position controller 1 and the speed controller 2, respectively.

The amplifier 101 multiplies the value output from the position controller 1 with the adjustment gain Kg, and outputs the resulting value as the speed command ωr. The amplifier 102 multiplies the value output from the speed controller 2 with the adjustment gain Kg, and outputs the resulting value as the torque command Tr.

For the sake of simplicity of description, also in the embodiment, in the same manner as the conventional art example, it is assumed that the controlled object is a rigid body and the total inertia of the controlled object and the motor 4 is J, and also that the response of the torque amplifier 3 is so fast as to be negligible.

When the transfer function G(S) from the position command θr of FIG. 5 to the position response is calculated (in this case, it is assumed that Kv0=Kv/J, because the speed loop gain Kv is usually changed in conjunction with the inertia J), the follows are attained:

$$G(S)=G1/G2 \quad (1)$$

$$G1=Kg^2 \cdot Kv0 \cdot Kp \quad (2)$$

$$G2=(S^2+Kg \cdot Kv0 \cdot S+Kg^2 \cdot Kv0 \cdot Kp) \quad (3)$$

The stability of the control system is determined by the root of the characteristic equation G2=0, i.e., poles ρ+ and ρ− of the control system.

From expression (3)

$$\rho+=-Kg\{Kv0-(Kv0^2-Kv0 \cdot Kp)0.5\}/2 \quad (4)$$

$$\rho-=-Kg\{Kv0-(Kv0^2+Kv0 \cdot Kp)0.5\}/2 \quad (5)$$

Then, it is assumed that Kv0 and Kp are once determined. When Kg is changed, only the scale relating to the time in the pole assignment is changed, and the amount relating to overshoot is not changed.

In order to describe the above in a form which is usually used, the following is set:

$$G2=(S^2+2\zeta\omega S+\omega^2) \quad (6)$$

Then, the followings are obtained:

$$\omega=Kg(Kv0 \cdot Kp)0.5 \quad (7)$$

$$\zeta=(Kv0/Kp)0.5/2 \quad (8)$$

From the above, it will be seen that only $\omega$ relates to Kg.

FIG. 6 shows the pole assignment in this case. It will be seen that, when Kp and Kv0 are once determined, the amount of overshoot is not changed by Kg, and hence the balance of the response waveform is not changed, and only the time direction (i.e., $\omega$) is changed.

Figure 7:
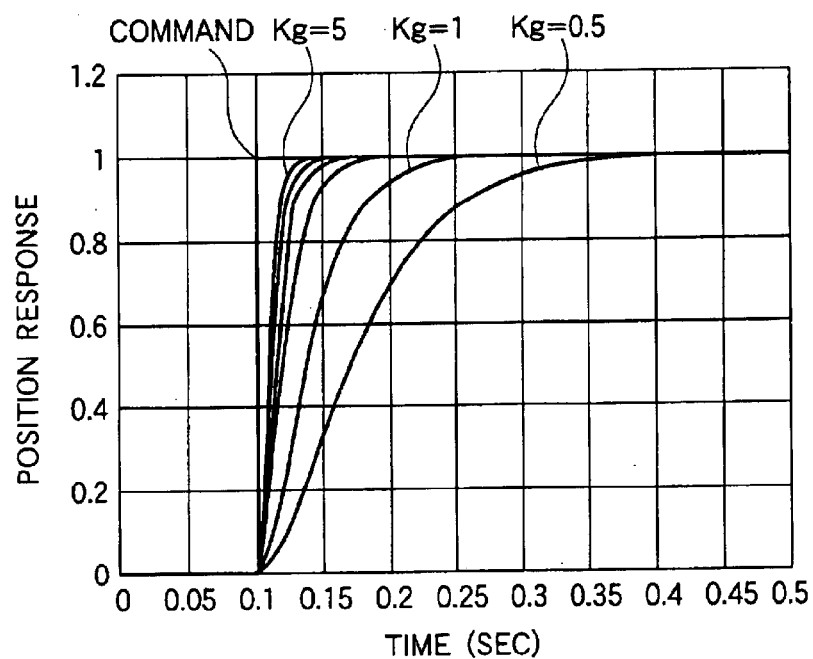
FIG. 7 is a view showing changes of the response characteristic in the case where the value of an adjustment gain Kg is changed.
Figure 36:
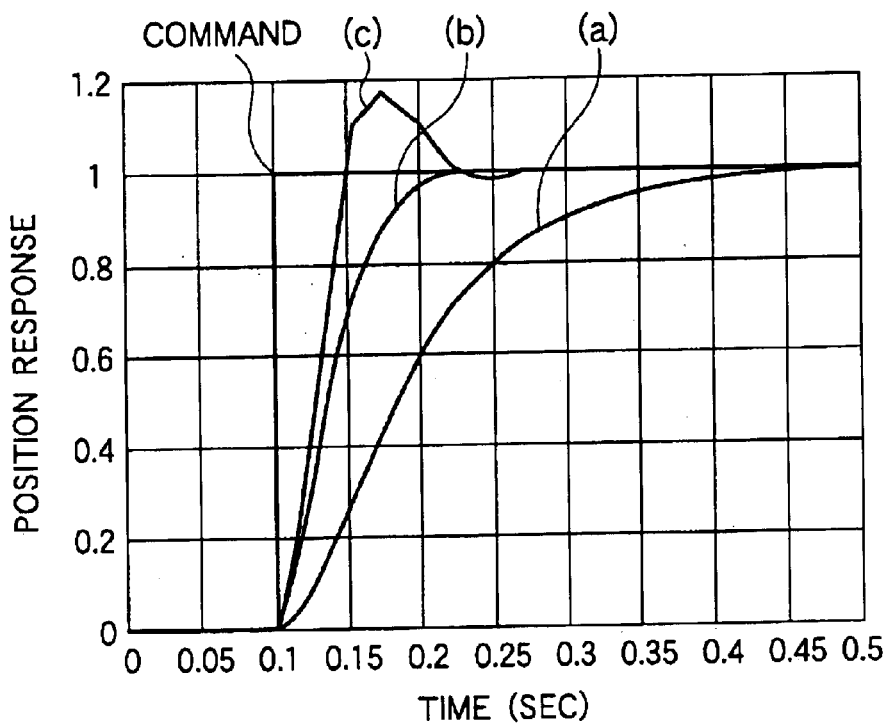
FIG. 36 is a view showing changes of a response characteristic of the conventional positioning servo controller.
Figure 37:
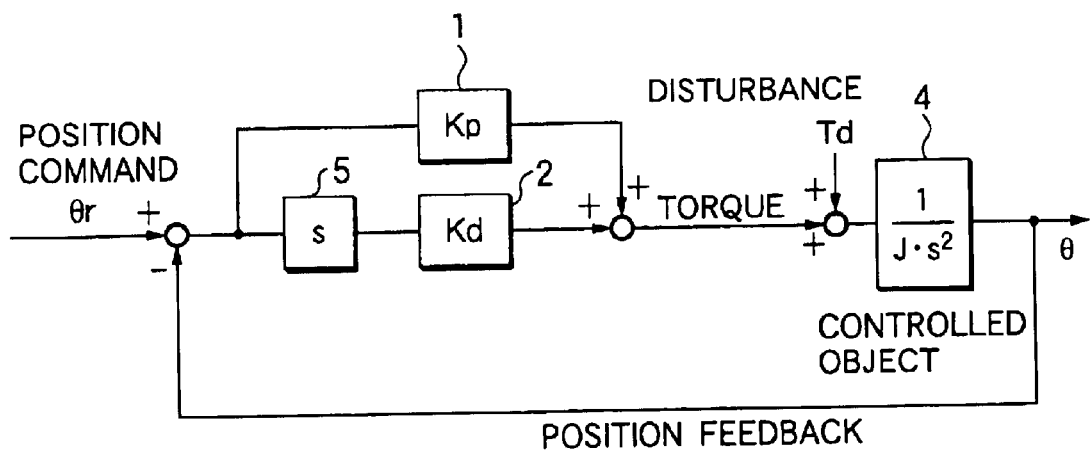
FIG. 37 is a block diagram showing the configuration of the conventional positioning servo controller.
Figure 38:
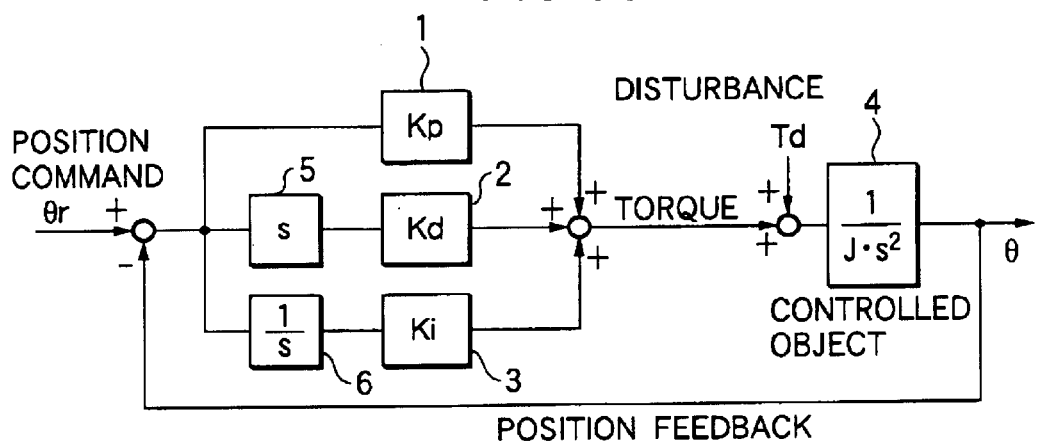
FIG. 38 is a block diagram showing the configuration of another conventional positioning servo controller.

In FIG. 7, for example, Kg is changed from 0.5 to 5. The state where there is no overshoot is unchanged, and only the response speed is enhanced. In the figure, it is assumed that Kg=1 in the state of the line (b) of FIG. 36.

As described above, in the positioning servo controller of the embodiment, when the values of Kv and Kp are once determined and then fixed, the response characteristic depends on the one parameter or Kg.

(Embodiment 2-2)

Next, a positioning servo controller of Embodiment 2-2 will be described.

Figure 8:
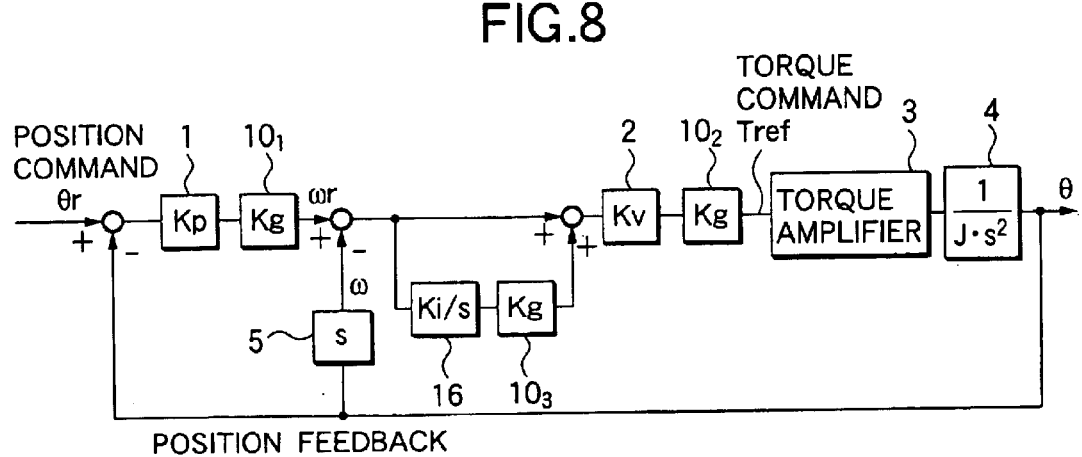
FIG. 8 is a block diagram showing the configuration of a second positioning servo controller of the second embodiment.

FIG. 8 is a block diagram showing the configuration of the positioning servo controller of the second embodiment of the invention.

In the positioning servo controller of the embodiment, the invention is applied to a positioning servo controller in which the position is controlled by the P (Proportional) control and the speed is controlled by the P-I (Proportional-Integral) control.

The positioning servo controller of the embodiment is configured so that, in the positioning servo controller of the first embodiment shown in FIG. 5, an integrator 16 and an amplifier 103 are further disposed.

The integrator 16 integrates the speed deviation between the speed command $\omega r$ and the speed $\omega$ of the motor 4, and outputs a value which is obtained by multiplying the result of the integration with the integral gain Ki. The amplifier 103 multiplies the value output from the integrator 16 with the adjustment gain Kg, and outputs the result of the multiplication to the speed controller 2.

The speed controller 2 in the embodiment receives a value which is obtained by adding the value output from the amplifier 103 to the speed deviation between the speed command $\omega r$ output from the amplifier 101 and the speed $\omega$ of the motor 4 that is obtained by the differentiator 5, and outputs a value which is obtained by multiplying the value with the speed loop gain Kv, to the amplifier 102.

When the transfer function G(S) from the position command $\theta r$ to the position response $\theta$ is calculated, the follows are attained:

$$G(S)=G1/G2 \quad (9)$$

$$G1=Kg^2 \cdot Kv0 \cdot KD(S+Kg^2 \cdot Ki) \quad (10)$$

$$G2=(S^3+Kg \cdot Kv0 \cdot S^2+Kg^2(Kv0 \cdot Ki+Kv0 \cdot Kp)S+Kg^3 \cdot Kv0 \cdot Kp \cdot Ki) \quad (11)$$

With respect to the root (pole) of the characteristic equation G2=0, when Kv0, Ki, and Kp are once determined, the waveform is not changed by the value of Kg.

For example, the case where G2=0 has a triple root—Kg$\rho$ will be considered. Then, the following is obtained:

$$\begin{aligned}G2 &= (S + Kg\rho)^3 \\ &= (S^3 + 3Kg\rho S^2 + 3Kg^2\rho^2 S + Kg^3\rho^3)\end{aligned} \quad (12)$$

When expressions (11) and (12) are compared with each other, the followings are attained:

$$Kv0=3\rho,$$

$$3\rho^2=Kv0 \cdot Ki+Kv0 \cdot Kp,$$

$$\rho^3=Kv0 \cdot Kp \cdot Ki \quad (13)$$

Therefore, $\rho$ is a constant which, when Kv0, Ki, and Kp are once determined, is determined irrespectively of the value of Kg.

From expression (12), therefore, the triple root—Kg$\rho$ is changed only in magnitude when Kg is changed, and remains to be a triple root. In other words, the response characteristic is unchanged.

(Embodiment 2-3)

Next, a positioning servo controller of Embodiment 2-3 will be described.

Figure 9:
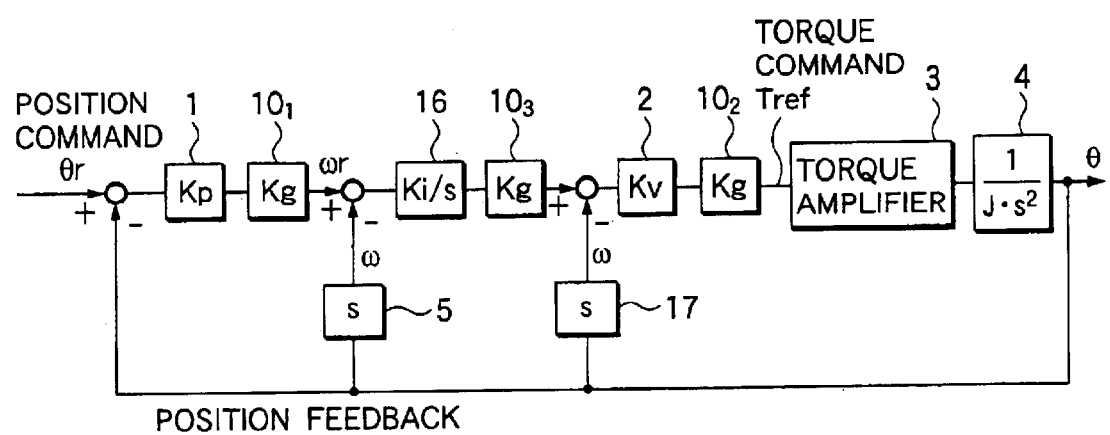
FIG. 9 is a block diagram showing the configuration of a third positioning servo controller of a third embodiment.

FIG. 9 is a block diagram showing the configuration of the positioning servo controller of the third embodiment of the invention.

In the positioning servo controller of the embodiment, the invention is applied to a positioning servo controller in which the position is controlled by the P (Proportional) control and the speed is controlled by the I-P (Proportional-Integral) control.

The positioning servo controller of the embodiment is configured so that, in the positioning servo controller of the second embodiment shown in FIG. 8, a differentiator 17 is further disposed. The differentiator 17 differentiates the position $\theta$ of the motor 4, and outputs the speed $\omega$ of the motor 4.

The speed controller 2 in the embodiment receives a value which is obtained by adding the value of the speed $\omega$ that is the output of the differentiator 17 to the value output from the amplifier 103, and outputs a value which is obtained by multiplying the value with the speed loop gain Kv.

The characteristic equation of the transfer function G(S) from the position command $\theta r$ to the position response $\theta$ in the positioning servo controller of the embodiment is as follows:

$$G2'=(S^3+Kg \cdot Kv0 \cdot S^2+Kg^2Kv0 \cdot Ki \cdot s+Kg^3 \cdot Kv0 \cdot Kp \cdot Ki) \quad (14)$$

When expressions (12) and (14) are compared with each other, the followings are attained:

$$Kv0=3\rho,$$

$$3\rho^2=Kv0 \cdot Ki,$$

$$\rho^3=Kv0 \cdot Kp \cdot Ki \quad (15)$$

Therefore, $\rho$ is a constant which, when Kv0, Ki, and Kp are once determined, is determined irrespectively of the value of Kg.

Consequently, the positioning servo controller of the embodiment can attain the same effects as those of the positioning servo controller of the second embodiment.

Embodiments 2-1 to 2-3 have been described in the case where the position loop gain Kp and the speed loop gain Kv are constants. The invention is not restricted to such a case, and is effective also in the case where the position loop gain Kp and the speed loop gain Kv can be changed by internal variables such as the position deviation, the feedback speed, and the like, and facilitates adjustment of parameters.

In such a case, namely, it is required to make only Kg variable while maintaining the position loop gain Kp, the speed loop gain Kv, and the speed loop integral gain Ki to be fixed.

As described above, according to the invention, the response characteristic can be adjusted simply by adjusting one parameter, and hence the effect that a requested response characteristic can be easily realized is attained.

(Embodiment 3)

Next, Embodiment 3 of the invention which attains the third object will be described in detail with reference to FIGS. 10 to 20.

(Embodiment 3-1)

Figure 10:
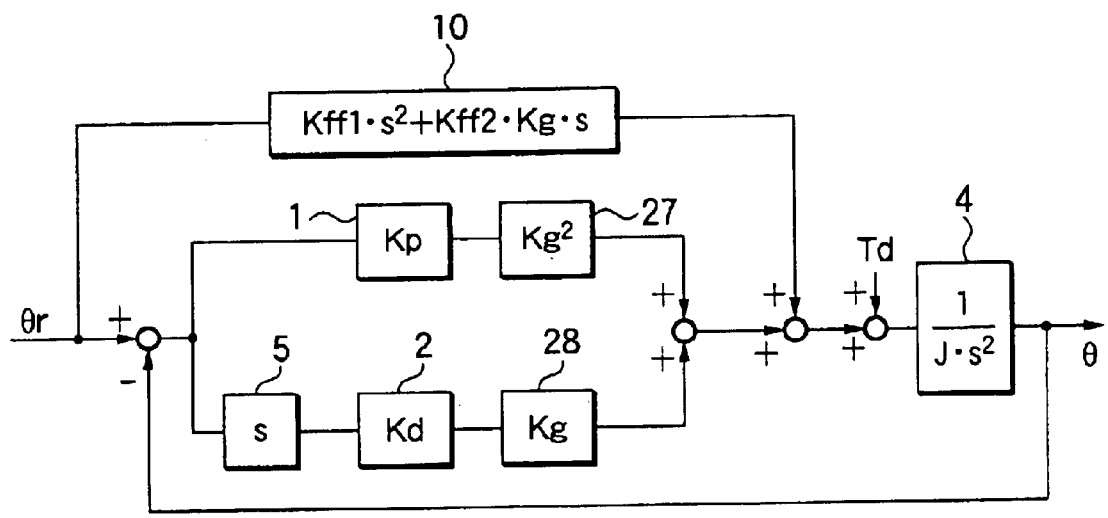
FIG. 10 is a block diagram showing the configuration of a first positioning servo controller of the third embodiment.

FIG. 10 is a block diagram showing the configuration of a positioning servo controller of Embodiment 3-1.

Figure 39:
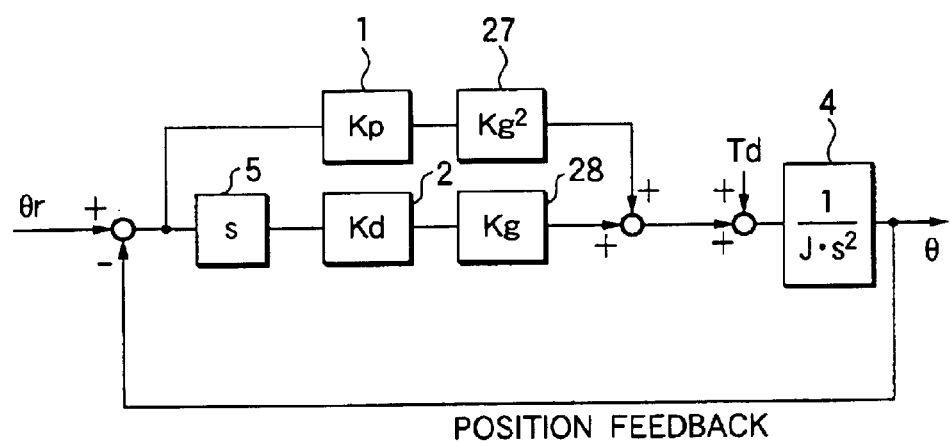
FIG. 39 is a block diagram showing the configuration of a positioning servo controller in which the conventional positioning servo controller of FIG. 37 is modified so that a gain adjustment is performed by an adjustment gain Kg.

In FIG. 10, components identical with those of FIG. 39 are denoted by the same reference numerals, and their description is omitted.

The positioning servo controller of the embodiment is configured so that, in the conventional positioning servo controller shown in FIG. 39, a feedforward controller 10 is further disposed to set the control system as a two-degree of freedom system, and the gain is correlated with the adjustment gain Kg which is a common parameter of the feedback system.

The feedforward controller 10 outputs a value that is obtained by adding a value obtained by amplifying a value obtained by second-order differentiation of the position command θr, by the feedforward gain Kff1, to a value obtained by amplifying a value obtained by first-order differentiation of the position command θr, by the feedforward gain Kff2 and the adjustment gain Kg.

In the embodiment, the torque for controlling the motor 4 is produced by a torque amplifier which is not shown, by using a value obtained by adding together the values output from the amplifiers 27 and 28 and the feedforward controller 10, as the torque command.

Figure 11:
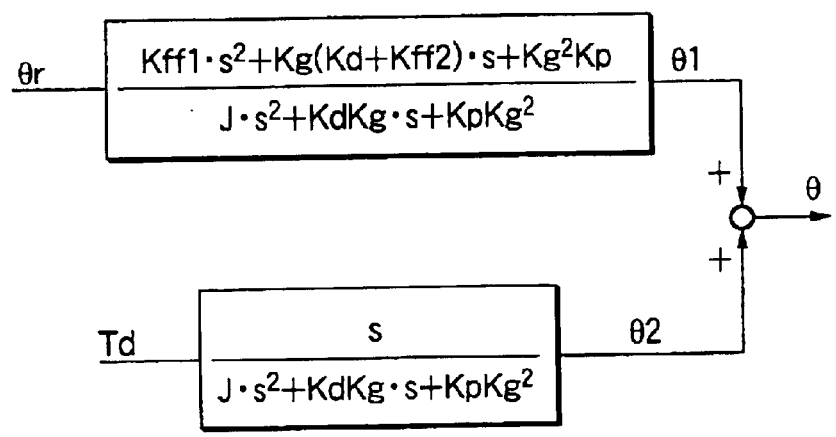
FIG. 11 is a view illustrating a response of the positioning servo controller of FIG. 10.

FIG. 11 shows the transfer function of the positioning servo controller of the embodiment shown in FIG. 10. At this time, the disturbance response depends only on the denominator of the transfer function from the disturbance Td to θ2.

When this is indicated by Gd, this is expressed by expression (16) below.

For the sake of simplicity of description, it is assumed that J=1.

$$Gd = S^2 + Kg \cdot Kd \cdot S + Kg^2 \cdot Kp \quad (16)$$

The stability of the control system is determined by the root of the characteristic equation Gd=0, i.e., poles ρ+ and ρ− of the control system.

From expression (16)

$$\rho+ = -Kg\{Kd-(Kd^2-4Kp)^{0.5}\}/2 \quad (17)$$

$$\rho- = -Kg\{Kd+(Kd^2-4Kp)^{0.5}\}/2 \quad (18)$$

Then, it is assumed that Kd and Kp are once determined. When Kg is changed, only the scale relating to the time in the pole assignment is changed, and the amount relating to overshoot is not changed.

In order to describe the above in a form which is usually used, the following is set:

$$Gd = (S^2 + 2\zeta\omega S + \omega^2) \quad (19)$$

Then, the followings are obtained:

$$\omega = Kg(Kp)^{0.5} \quad (20)$$

$$\zeta = Kd/(2Kp^{0.5}) \quad (21)$$

From the above, it will be seen that only ω relates to Kg.

Figure 12:
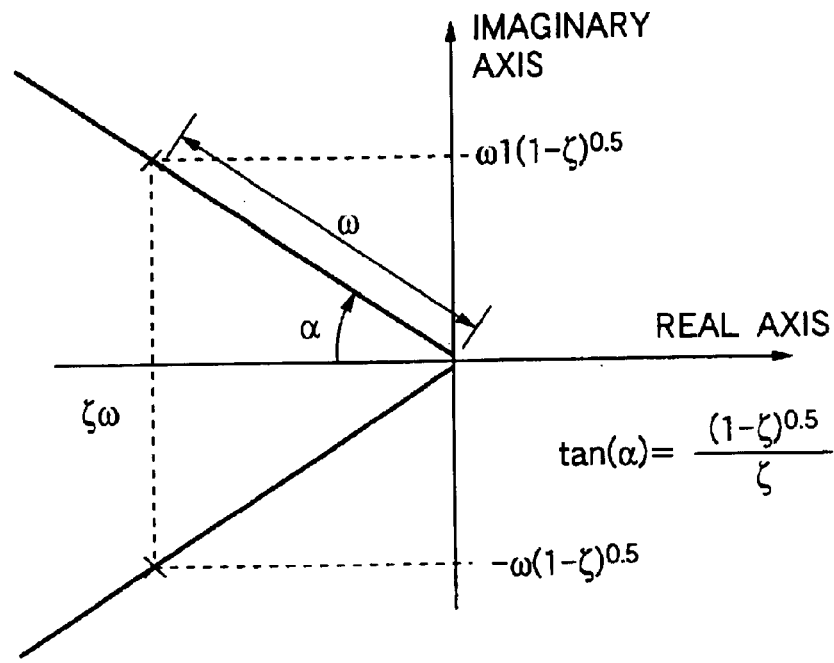
FIG. 12 is a pole map illustrating the operation of a disturbance response in the positioning servo controller of FIG. 10.

FIG. 12 shows the pole assignment in this case. It will be seen that, when Kp and Kd are once determined, the amount of overshoot is not changed by Kg, and hence the balance of the response waveform is not changed, and only the time direction (i.e., ω) is changed.

On the other hand, the command response is determined by the transfer function from the position command θr to the position deviation θ1. The transfer function in this case is set as G=G1/G2. In addition to the denominator, also the numerator is changed by the control gain. Therefore, the responsibility of the control system is determined by the root of the characteristic equation G2=0, i.e., poles ρ+ and ρ− of the control system, and the root of the characteristic equation G1=0, i.e., the zero point of the control system.

With respect to the poles, since G2=Gd, expressions (16) to (21) are similarly applicable as they are. Consequently, only the zero point will be discussed here. For the sake of simplicity of description, it is assumed that J=1.

The following is set:

$$G1 = Kff1 \cdot S^2 + Kg(Kd+Kff_2)S + Kg^2 \cdot Kp = 0 \quad (22)$$

By solving this expression (22), zero points z+ and z− are determined.

From expression (22), following expressions (23) and (24) are obtained:

$$z_+ = -Kg\{Kd+Kff2\} - [(Kd+Kff2)^2 - 4Kff1 \cdot Kp]^{0.5}\}/(2Kff1) \quad (23)$$

$$z_- = -Kg\{Kd+Kff2\} + [(Kd+Kff2)^2 - 4Kff1 \cdot Kp]^{0.5}\}/(2Kff1) \quad (24)$$

Even if Kd and Kp which determine the poles are once determined, the response can be changed by Kff1 and Kff2.

Namely, the control system can be determined independently of the disturbance response.

By contrast, when Kd, Kp, Kff1, and Kff2 are once determined, only the scale relating to the time is changed by Kg, and the amount relating to overshoot is not changed.

In order to describe the above in a form which is usually used, the following is set:

$$G1 = Kff1(S^2 + 2\zeta1\omega1S + \omega1^2) \quad (25)$$

Then, the followings are obtained:

$$\omega1 = Kg(Kp/kff1)^{0.5} \quad (26)$$

$$\zeta1 = (Kd+Kff2)/\{2(Kff1 \cdot Kp)^{0.5}\} \quad (27)$$

From the above, it will be seen that only ω1 relates to Kg.

Figure 13:
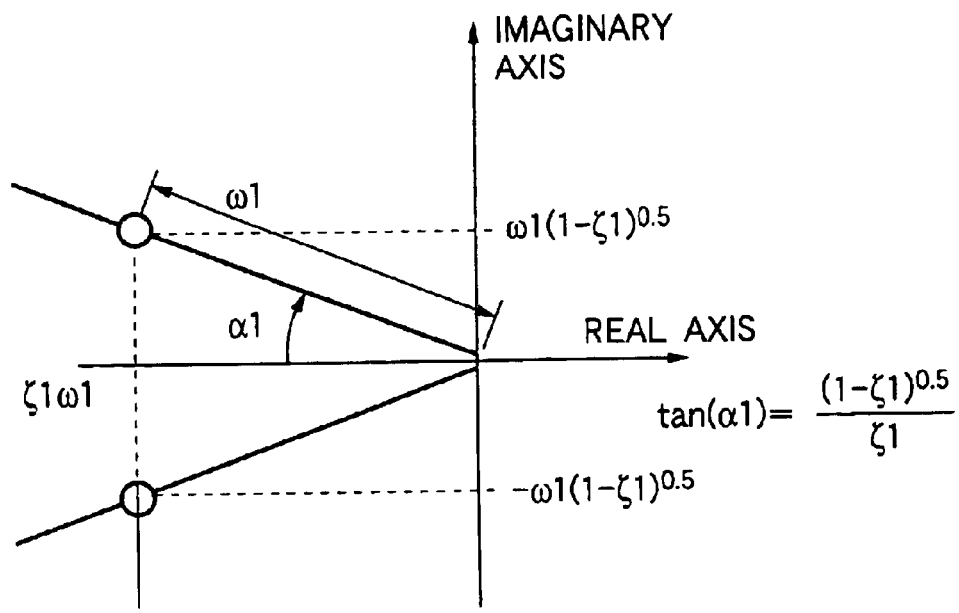
FIG. 13 is a pole map illustrating the operation of a command response in the positioning servo controller of FIG. 10.

FIG. 13 shows the pole assignment in this case. It will be seen that, when Kd, Kp, Kff1, and Kff2 are once determined, the balance is not changed by Kg, and only the time direction (i.e., ω1) is changed.

Figure 14:
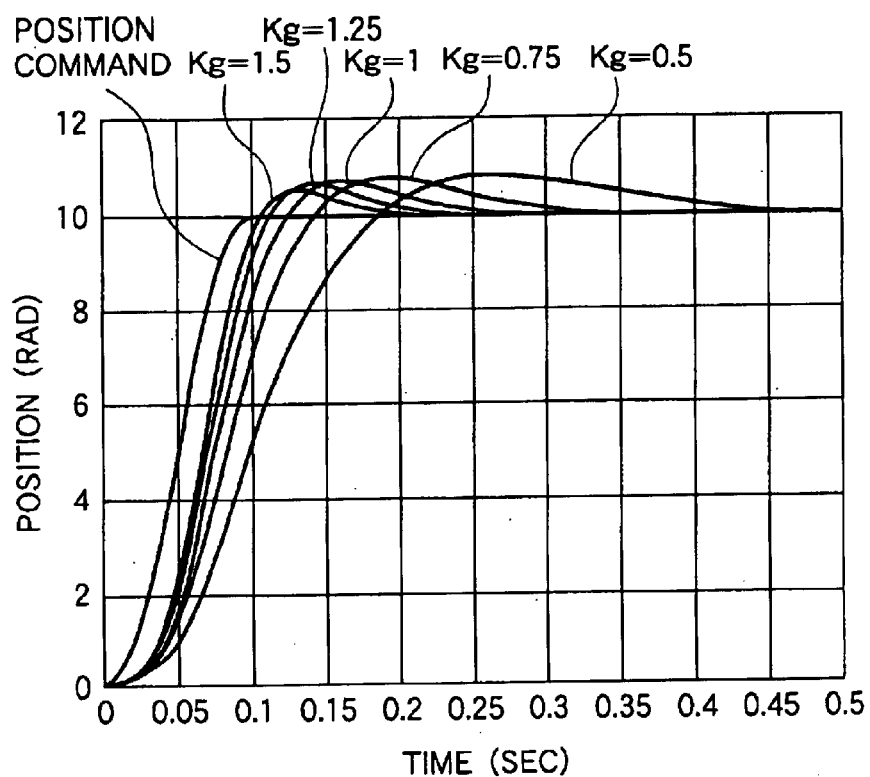
FIG. 14 is a view showing changes of response waveforms in the case where the value of the adjustment gain Kg is changed in the positioning servo controller of FIG. 10.

FIG. 14 shows the response waveform in the embodiment.

FIG. 14 shows the response waveform in the case where Kg is changed from 0.5 to 1.5. The whole waveform is not changed, and only the response speed is enhanced.

In this case, Kd=40, Kp=800, Kff1=0, Kff2=−16, and J=1, and the position command θr is set so that the maximum speed=200 (rad/s), the acceleration time and the deceleration time=0.05 (sec), and the command delivery time is 0.1 (sec).

In this way, after Kd and Kp are once determined, with respect to the command response, the response characteristic is determined by the one parameter or Kg.

Figure 15:
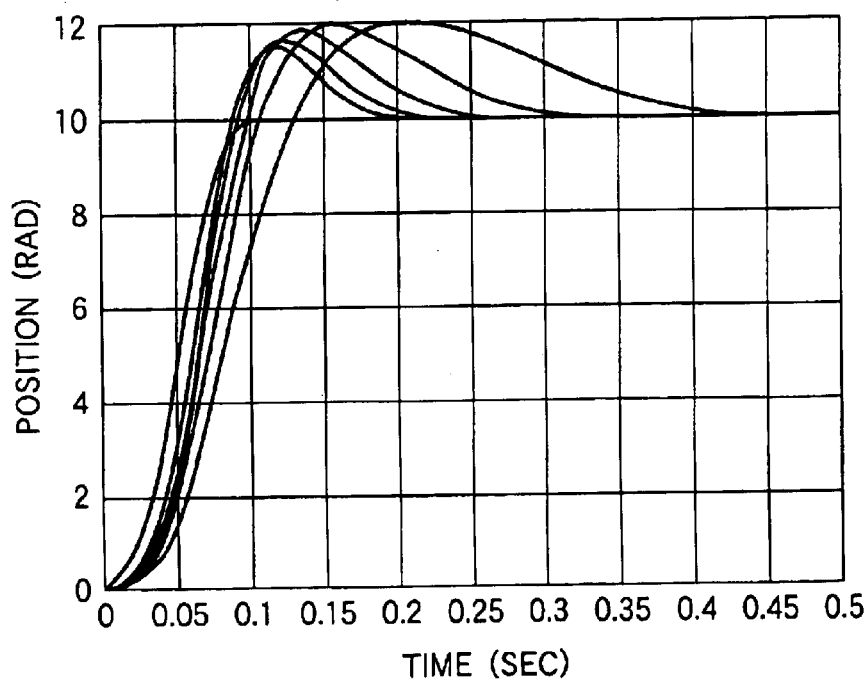
FIG. 15 is a view showing changes of the response waveforms in the case where feedforward gains Kff1 and kff2 are set to 0.

FIG. 15 shows response waveforms in the embodiment in the case where, in order to compare the effect of the positioning servo controller of the embodiment with that of the conventional art example, the feedforward gain Kff1=Kff2=0 and Kg is changed from 0.5 to 1.5. By setting Kff1=Kff2=0, the response waveforms of FIG. 15 become those of the conventional positioning servo controller shown in FIG. 39.

When the response waveforms of FIG. 15 which are the response waveforms of the conventional positioning servo controller in which the feedforward controller 10 is not disposed is compared with those shown in FIG. 14, it will be seen that the response waveforms in the conventional positioning servo controller are larger in amount of overshoot.

In the positioning servo controller of the embodiment, the gain of the feedforward controller 10 is correlated with the adjustment gain Kg which is a common parameter of the feedback system, thereby enabling the response characteristic to be adjusted by one parameter, i.e., the adjustment gain Kg.

In other words, in the case where a feedforward controller is simply disposed in a conventional positioning servo controller and the adjustment gain Kg is not contained in the gain of the feedforward controller, it is difficult to adjust the response characteristic, and the effect of the embodiment cannot be attained.

Figure 16:
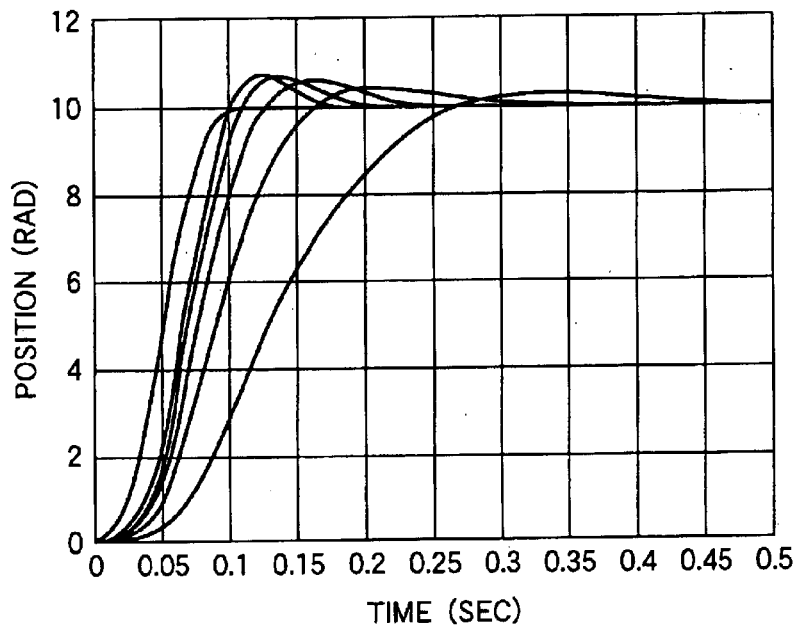
FIG. 16 is a view showing changes of the response waveforms in the case where the adjustment gain Kg in a feedforward controller 10 is set to 1.

In order to describe the above, FIG. 16 shows response waveforms in the case where Kg of the feedforward controller 10 of FIG. 10 is set to 1 and Kg is changed from 0.5 to 1.5.

Referring to FIG. 16, it will be seen that, with respect to the command response, the waveform is largely changed in accordance with the adjustment gain Kg and hence adjustment is difficult.

In the positioning servo controller of the embodiment, the feedforward gains Kff1 and Kff2 can be set independent of the feedback control system, and, in both the feedback and feedforward control systems, $Kg^2$ is multiplied with the position term, and Kg is multiplied with the speed term (first-order differential term). When the response waveform is once determined, therefore, it is required only to adjust the adjustment gain Kg, thereby enabling only the operation time to be changed while maintaining the response waveform.

In the positioning servo controller of the embodiment, namely, the feedforward controller 10 is disposed to set the control system as a two-degree of freedom system, and the gain of the feedforward controller 10 and that of the feedback system can be adjusted by the adjustment gain Kg which is one parameter. Therefore, the gain adjustment for determining the requested response characteristic can be simplified.

(Embodiment 3-2)

Next, a positioning servo controller of Embodiment 3-2 will be described.

Figure 17:
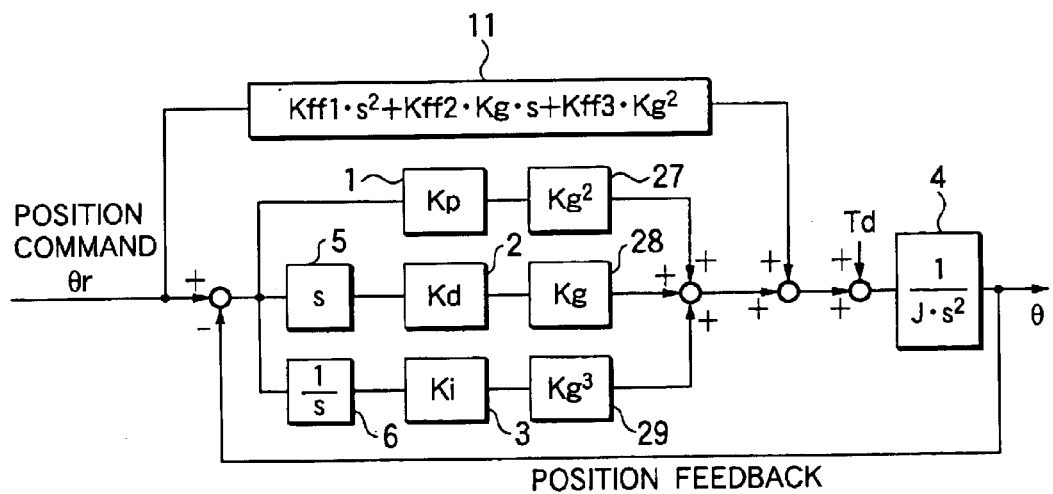
FIG. 17 is a block diagram showing the configuration of a second positioning servo controller of the third embodiment.
Figure 18:
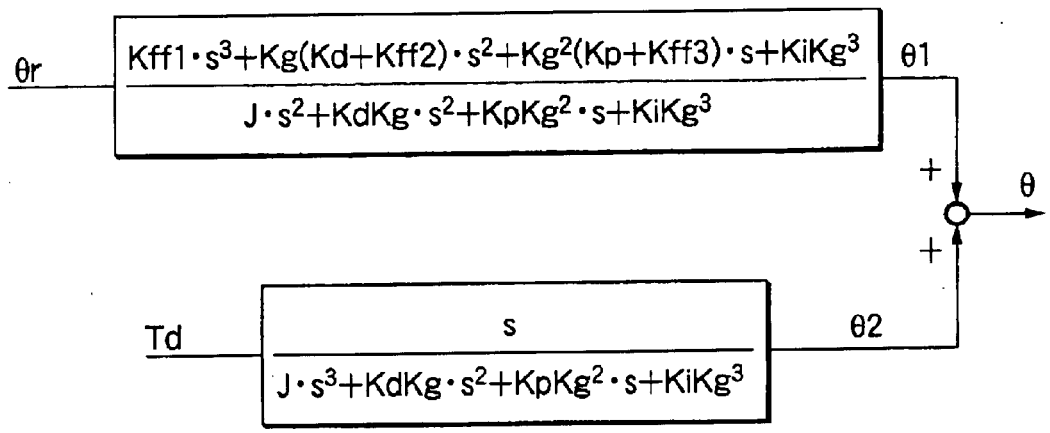
FIG. 18 is a view illustrating a response of the positioning servo controller of FIG. 17.

FIG. 17 is a block diagram showing the configuration of a positioning servo controller of the second embodiment of the invention, and FIG. 18 is a view illustrating the response of the positioning servo controller of FIG. 17.

Figure 40:
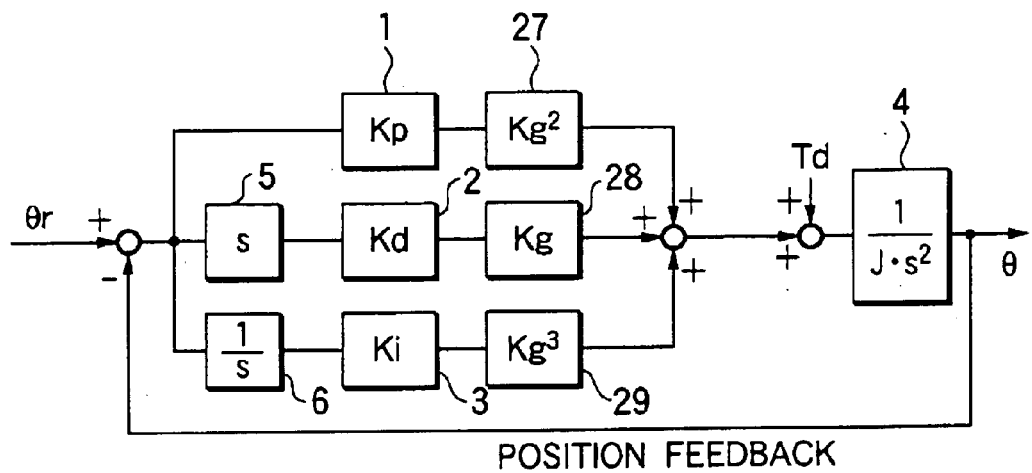
FIG. 40 is a block diagram showing the configuration of a positioning servo controller in which the conventional positioning servo controller of FIG. 38 is modified so that a gain adjustment is performed by an adjustment gain Kg.
Figure 41:
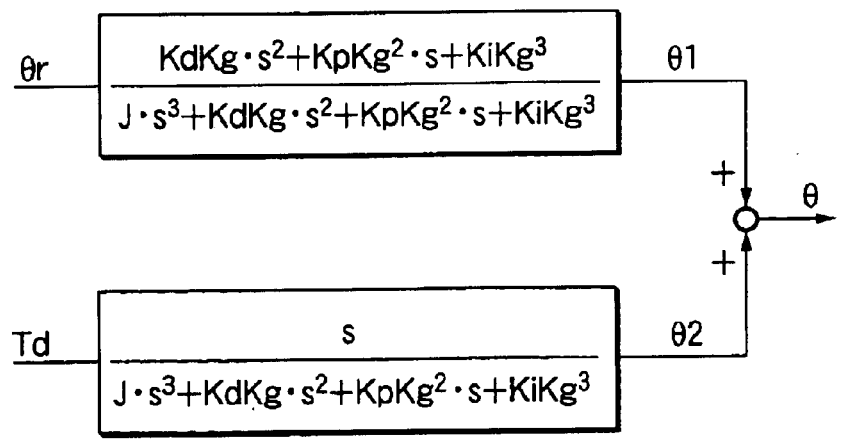
FIG. 41 is a view illustrating a response of the positioning servo controller of FIG. 40.

The positioning servo controller of the embodiment is configured so that, in the conventional positioning servo controller shown in FIG. 40, a feedforward controller 11 is further disposed.

The feedforward controller 11 outputs a value that is obtained by adding together a value obtained by amplifying a value obtained by second-order differentiation of the position command θr, by the feedforward gain Kff1, a value obtained by amplifying a value obtained by differentiating the position command θr, by the feedforward gain Kff2 and the adjustment gain Kg, and a value obtained by amplifying the position command θr by a feedforward gain Kff3 and $Kg^2$ which is a square of the adjustment gain Kg.

In the embodiment, the torque for controlling the motor 4 is produced by a torque amplifier which is not shown, by using a value obtained by adding together the values output from the amplifiers 27, 28, and 29 and the feedforward controller 11, as the torque command.

In the positioning servo controller of the embodiment, the feedforward controller 11 is disposed to set the control system as a two-degree of freedom system, and the gain of the feedforward controller 11 and that of the feedback system can be adjusted by the adjustment gain Kg which is one parameter. In the same manner as the positioning servo controller of the first embodiment, therefore, the gain adjustment for determining the requested response characteristic can be simplified.

(Embodiment 3-3)

Next, a positioning servo controller of Embodiment 3-3 will be described.

Figure 19:
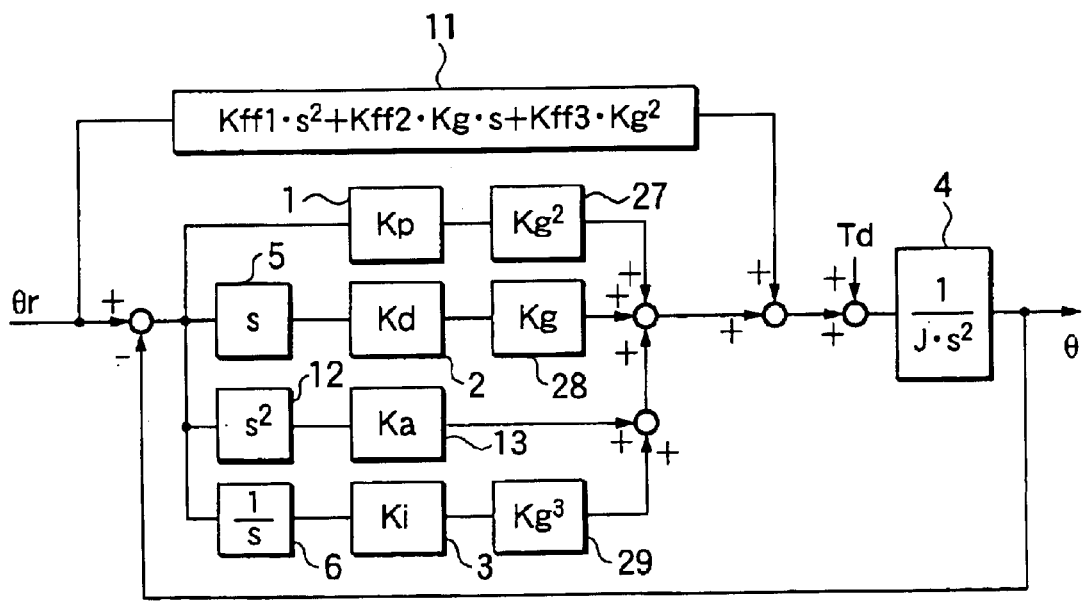
FIG. 19 is a block diagram showing the configuration of the third positioning servo controller of the third embodiment.
Figure 20:
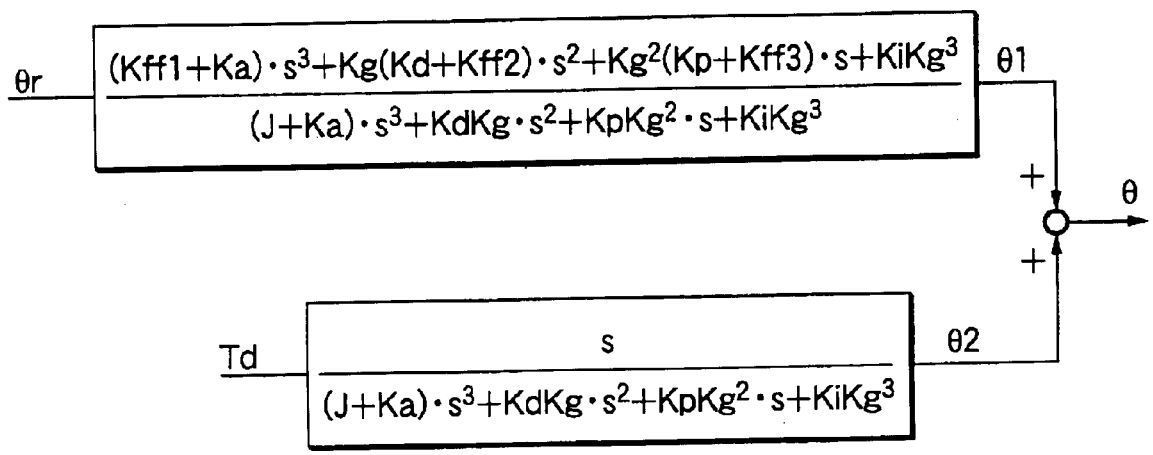
FIG. 20 is a view illustrating a response of the positioning servo controller of FIG. 19.

FIG. 19 is a block diagram showing the configuration of a positioning servo controller of the third embodiment of the invention, and FIG. 20 is a view illustrating the response of the positioning servo controller of FIG. 19.

The positioning servo controller of the embodiment is configured so that, in the positioning servo controller of the third embodiment shown in FIG. 17, a second-order differentiator 12 and an acceleration controller 13 are further disposed.

The second-order differentiator 12 performs second-order differentiation on the position deviation between the position command θr and the controlled object. The acceleration controller 13 outputs a value that is obtained by amplifying the value obtained by the second-order differentiator 12, by an acceleration gain Ki.

In the embodiment, the torque for controlling the motor 4 is produced by a torque amplifier which is not shown, by using a value obtained by adding together the values output from the amplifiers 27, 28, and 29, the acceleration controller 13, and the feedforward controller 11, as the torque command.

In the positioning servo controller of the embodiment, the feedforward controller 11 is disposed to set the control system as a two-degree of freedom system, and the gain of the feedforward controller 11 and that of the feedback system can be adjusted by the adjustment gain Kg which is one parameter. In the same manner as the positioning servo controller of the first embodiment, therefore, the gain adjustment for determining the requested response characteristic can be simplified.

As described above, according to the invention, both the gains of the feedback and feedforward control systems can be adjusted simply by adjusting one parameter, to adjust the response waveform, and hence it is possible to attain an effect that a requested response characteristic can be easily realized even in the case of adjustment of the disturbance response.

(Embodiment 4)

Next, an embodiment of the fourth invention which is an improvement of the above-mentioned first and second inventions will be described with reference to FIGS. 21 to 29.

As described above, in a positioning servo controller, usually, a speed loop process is disposed as a minor loop in the position loop process. In such a positioning servo controller of the feedback control system, the values of the position loop gain Kp and the speed loop gain Kv are finite values and have the upper limit. Therefore, the position response θ of the motor 4 fails to completely coincide with the position command θr, and so-called servo delay occurs.

As a method of eliminating such servo delay, there is a method in which, as in the above-mentioned positioning servo controller which is shown in FIG. 1, the speed feedforward controller 6, the acceleration feedforward controller 7, and the acceleration controller 8 that performs an acceleration feedback control on the basis of the deviation between the acceleration of the motor 4 and the acceleration command to output the torque command to the torque amplifier 3 are added.

The speed feedforward controller 6 outputs a first feedforward compensation amount which is obtained by amplifying a differential value of the position command θr by the feedforward gain Kff1 that is a first feedforward gain.

The first feedforward compensation amount is added to the value output from the position controller 1.

The acceleration feedforward controller 7 outputs a second feedforward compensation amount which is obtained by amplifying a differential value of the first feedforward compensation amount by the feedforward gain Kff2 that is a second feedforward gain.

The second feedforward compensation amount is added to the value output from the speed controller 2.

In the positioning servo controller of FIG. 1, even in the case where the inertia J of the motor 4 is not clearly known, when the value of the acceleration loop gain Ka of the acceleration controller 8 is set to an adequate one, the influence of the inertia J on the control response of the positioning servo controller can be eliminated. When the acceleration feedforward gain Kff2=1, the transfer function in which the position command θr is an input and the position response θ is an output is set to 1, whereby servo delay can be eliminated.

On the other hand, as a method in which optimum adjustment of the positioning state of the position response θ is easily conducted by adjusting various parameters of the control system such as the position loop gain Kp and the speed loop gain Kv, there is a method in which, as in the above-mentioned positioning servo controller which is shown in FIG. 5, the amplifier 10 that multiplies an input with the adjustment gain Kg is disposed behind the position controller 1 and the speed controller 2.

In this positioning servo controller, optimum adjustment of the positioning state of the position response θ can be easily conducted by adjusting only the adjustment gain Kg and without separately adjusting the position loop gain Kp and the speed loop gain Kv.

Figure 21:
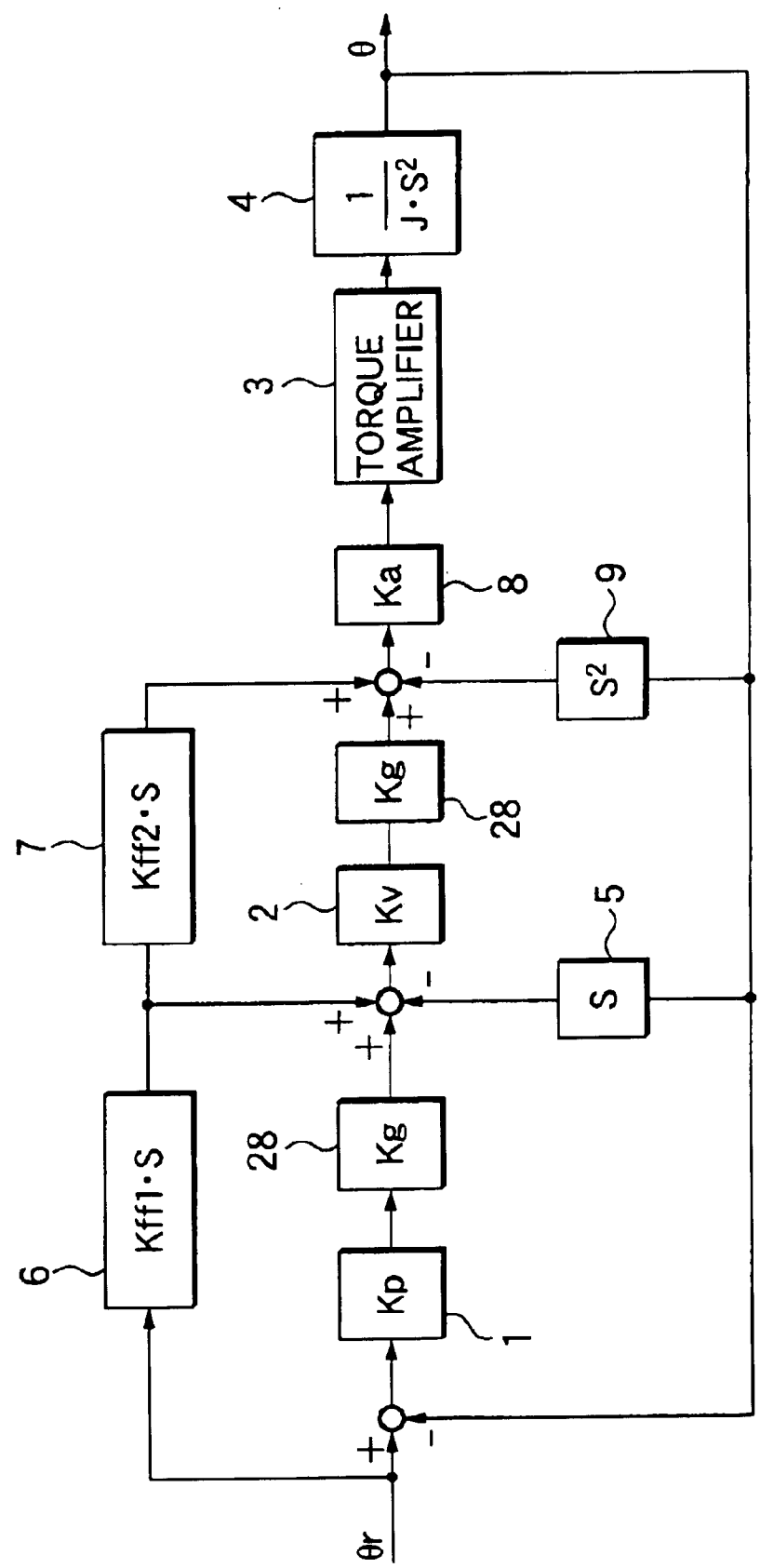
FIG. 21 is a control block diagram showing the configuration of a positioning servo controller of the feedforward control system in which a conventional adjustment gain is used.

FIG. 21 is a control block diagram showing the configuration of a positioning servo controller in which the above-mentioned two methods are used.

In such a positioning servo controller, as described above, servo delay can be eliminated, and optimum adjustment of the positioning state can be easily conducted.

The block diagram of the positioning servo controller of FIG. 21 can be modified as shown in FIGS. 22(*a*) and 22(*b*). In this case, it is assumed that the torque amplifier has a gain of 1.

Usually, a mechanical system which is a controlled object of the positioning servo controller is coupled to the shaft end of the motor 4 of the controller.

In the case where the value of the gain of a feedback control system, such as the adjustment gain Kg can be largely increased, usually, the mechanical system can be deemed as a rigid member of a high characteristic frequency.

In the case where the value of the gain of a feedback control system, such as the adjustment gain Kg cannot be largely increased, the mechanical system can be deemed as a mechanical system of low rigidity and a low characteristic frequency.

In the case where the mechanical system can be deemed as a rigid member of a high characteristic frequency, the feedforward gains Kff1 and Kff2 can be set to 1, and the block diagram of FIG. 22(*b*) can be replaced with that of FIG. 22(*c*).

When the value of the acceleration loop gain Ka is set to be sufficiently larger than that of the inertia J, J/Ka can be deemed to 0, and hence the block diagram of FIG. 22(*c*) can be replaced with that of FIG. 22(*d*).

Figure 23A:
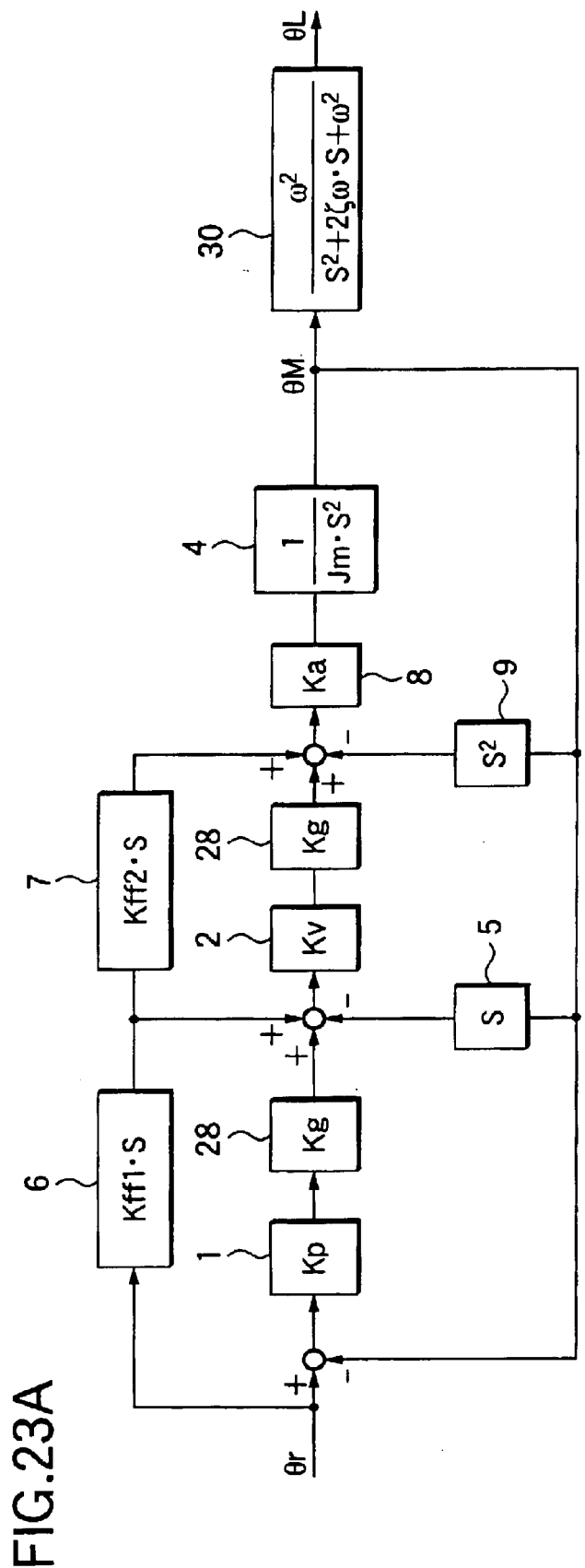
FIGS. 23($a$) and 23($b$) are the block diagrams showing the configuration of the positioning servo controller of FIG. 21 including a mechanical system which is a controlled object.
Figure 23B:
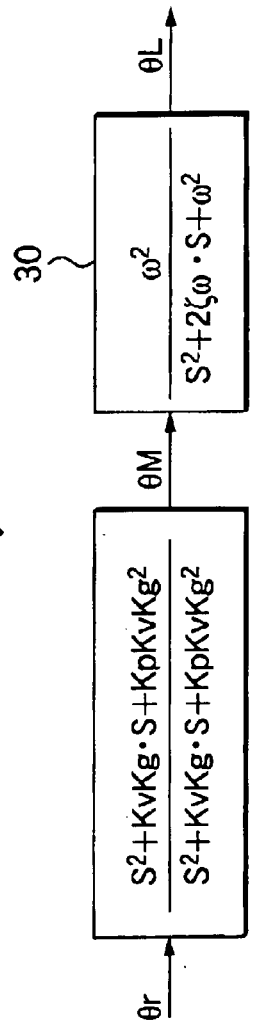

FIG. 23(*a*) is a block diagram of the positioning servo controller including a mechanical system which is a controlled object. In FIG. 23(*a*), it is assumed that the reaction force from a mechanical system 11 to the motor 4 is so small as to be negligible.

In the figure, θM denotes the position of the motor, θL denotes the position response θ of the mechanical system 11 coupled to the motor 4, ω denotes the resonance frequency of the mechanical system 11, and ζ denotes the damping coefficient of the mechanical system 11.

When the inertia of the mechanical system 11 is indicated by JL and the spring constant by K, ω has the following value:

$$\omega = (K/JL)^{0.5}.$$

In the case where the mechanical system 11 is an oscillation system, ζ is smaller than 1.

If the feedforward gains Kff1 and Kff2 are set to 1 and J/Ka is approximated to 0, the block diagram of FIG. 23(*a*) is approximated to that of FIG. 23(*b*).

FIGS. 24 to 28 are graphs showing manners of variations of the position command θr and the position response θL in the positioning servo controller of FIG. 21.

In FIGS. 24 to 28, the position command θr in which the acceleration/deceleration time of the motor is S-shaped acceleration/deceleration of 0.03 [sec], the traveling time of the motor 4 is 0.06 [sec], and the rotation angle of the motor 4 is 3 [rad] is input to the positioning servo controller.

In FIGS. 24 to 28, acceleration is started at 0 sec. and the position command θr is 3 [rad] at 0.06 sec. This time is set as the command end time.

In FIGS. 24 to 28, if the error between the position command θr and the position response θL is within the positioning completion width, positioning of the position response θL is deemed to be completed, and the time from the command end time to completion of positioning is set as the setting time.

The positioning completion width is set to ±0.5 [rad].

Figure 24:
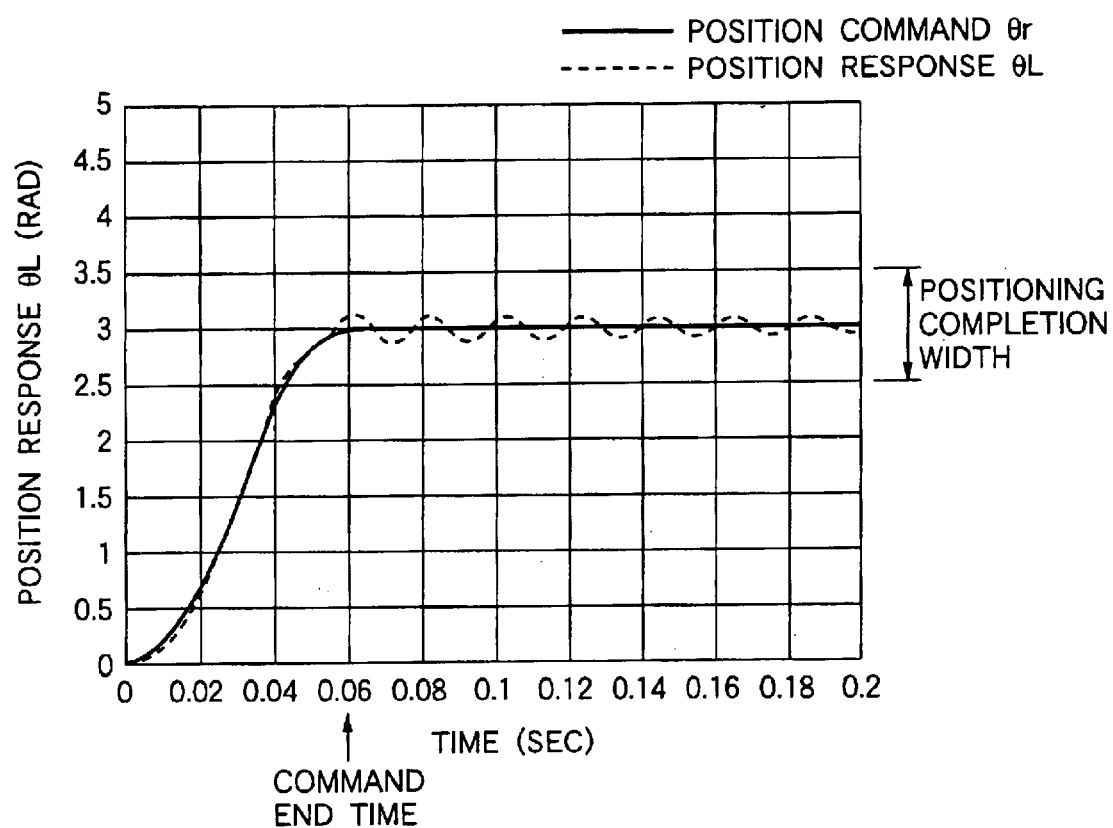
FIG. 24 is a graph showing variations of a position command and a position response in the case where the mechanical system has high rigidity.

FIG. 24 shows the manner of variations of the position response θL in the case where the mechanical system 11 is a mechanical system of high rigidity, ω=300, and ζ=0.01.

The control parameters are set so that Kp=20, Kv=60, Kg=2, and feedforward gains Kff1 and Kff2=1.

As shown in FIG. 24, after the command end time, the oscillation of the position response θL is within the positioning completion width, and the positioning of the position response θL is already completed at the command end time. In this case, therefore, the setting time is 0 sec.

Figure 25:
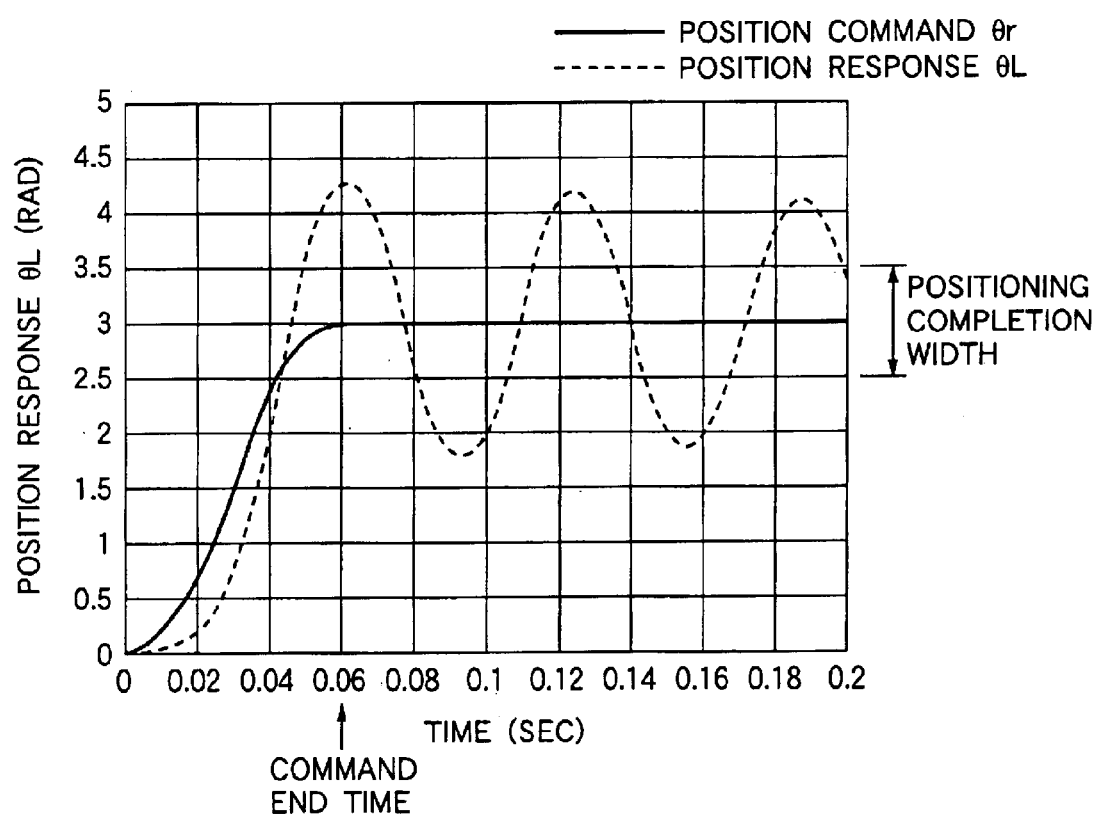
FIG. 25 is a graph showing variations of the position command and the position response in the case where the mechanical system has low rigidity.

When the rigidity of the mechanical system 11 is low, ω=100, and the values of the control parameters are identical with the conditions of FIG. 24, a large oscillation having the amplitude shown in FIG. 25 is generated in the position response θL.

In such a case, usually, the value of the adjustment gain Kg in the control parameters is reduced in order to suppress the oscillation.

Figure 26:
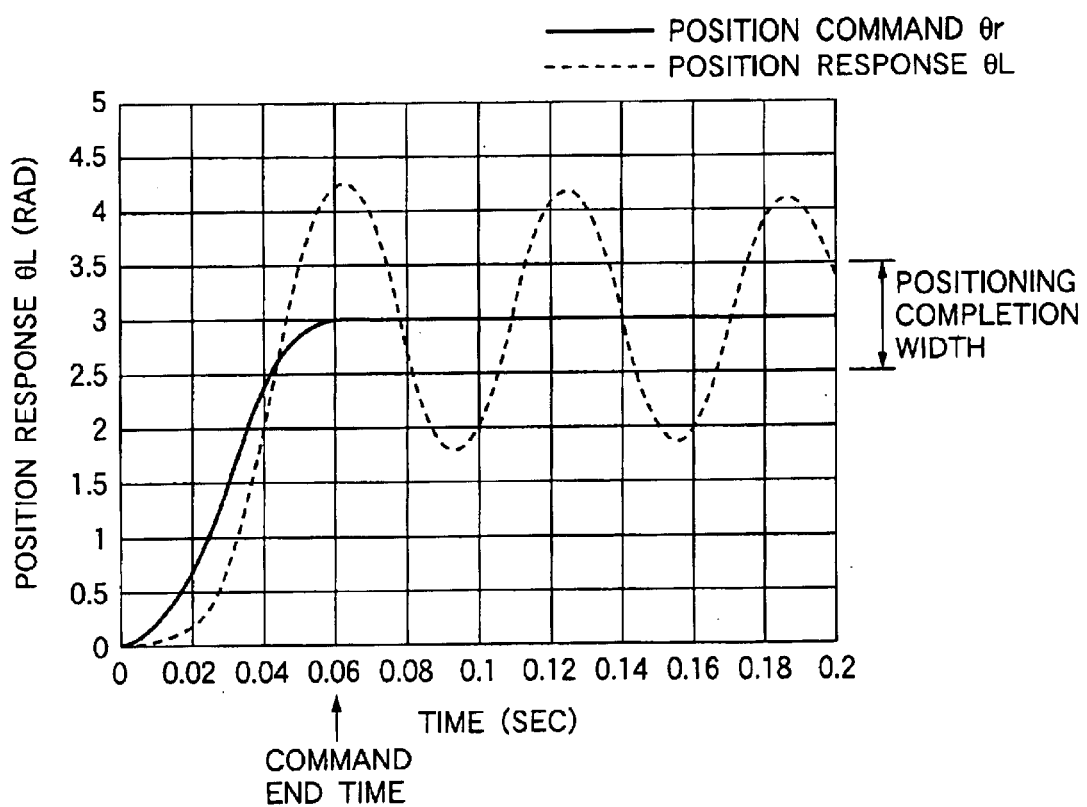
FIG. 26 is a graph showing variations of the position command and the position response in the case where the value of the adjustment gain is adjusted.

FIG. 26 is a graph showing the manner of variations of the position response θL in the case where, in the mechanical system 11 of low rigidity in the same manner as FIG. 25, the value of the adjustment gain Kg in the control parameters of FIG. 25 is reduced from 2 to 1.

As shown in FIG. 26, however, the oscillation of the position response θL remains not to converge, and the positioning of the position response θL is not completed even after elapse of 0.14 sec from the command end.

Figure 27:
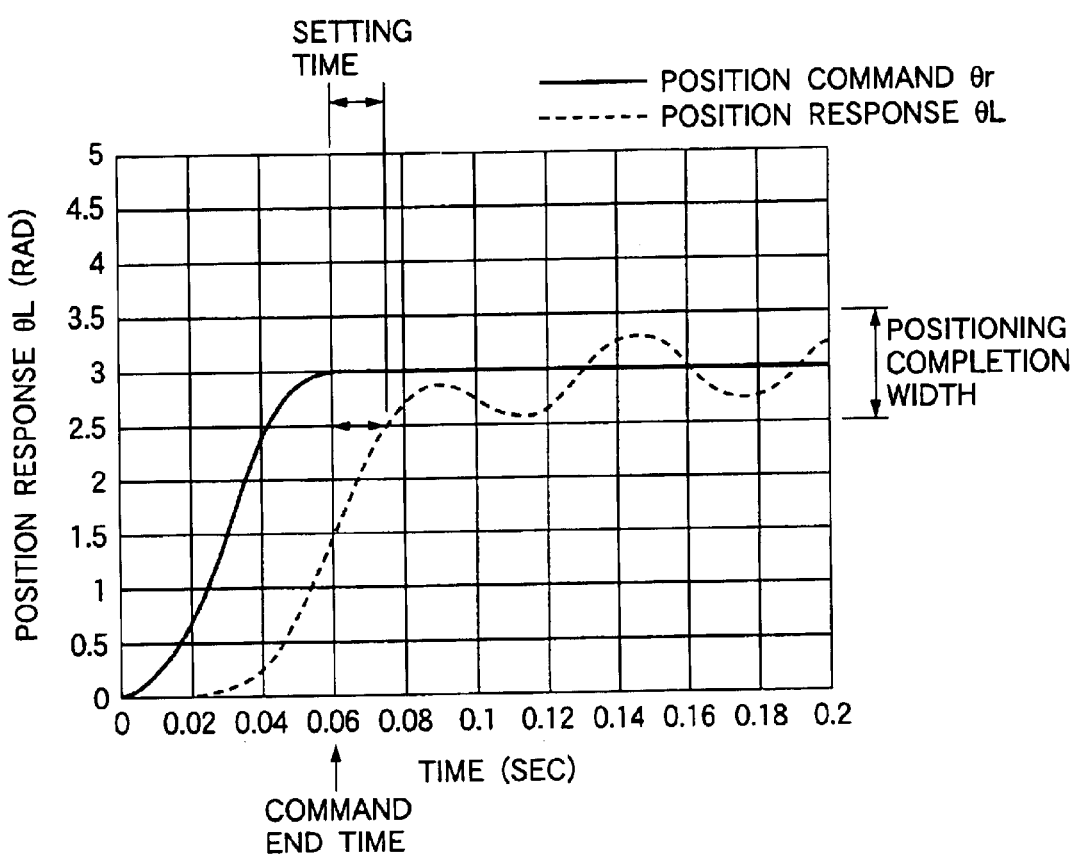
FIG. 27 is a graph showing variations of the position command and the position response in the case where a feedforward gain is adjusted.

Therefore, the values of the feedforward gains Kff1 and kff2 are then reduced. FIG. 27 is a graph showing the manner of variations of the position response θL in the case where, in the mechanical system 11 of low rigidity in the same manner as FIG. 26, the values of the feedforward gains Kff1 and kff2 in the control parameters of FIG. 26 are changed from 1 to 0.

As shown in FIG. 27, when the feedforward gains Kff1 and kff2 are set to 0, the amplitude of the oscillation of the position response θL is reduced, and the oscillation converges within the positioning completion width, and the setting time is about 0.012 sec.

When the feedforward gains Kff1 and kff2 are set to 0, however, the effect of the feedforward control is thoroughly lost.

Therefore, the feedforward gains Kff1 and kff2 and the adjustment gain Kg are again adjusted by try and error to conduct optimum adjustment of the positioning of the position response θL.

Figure 28:
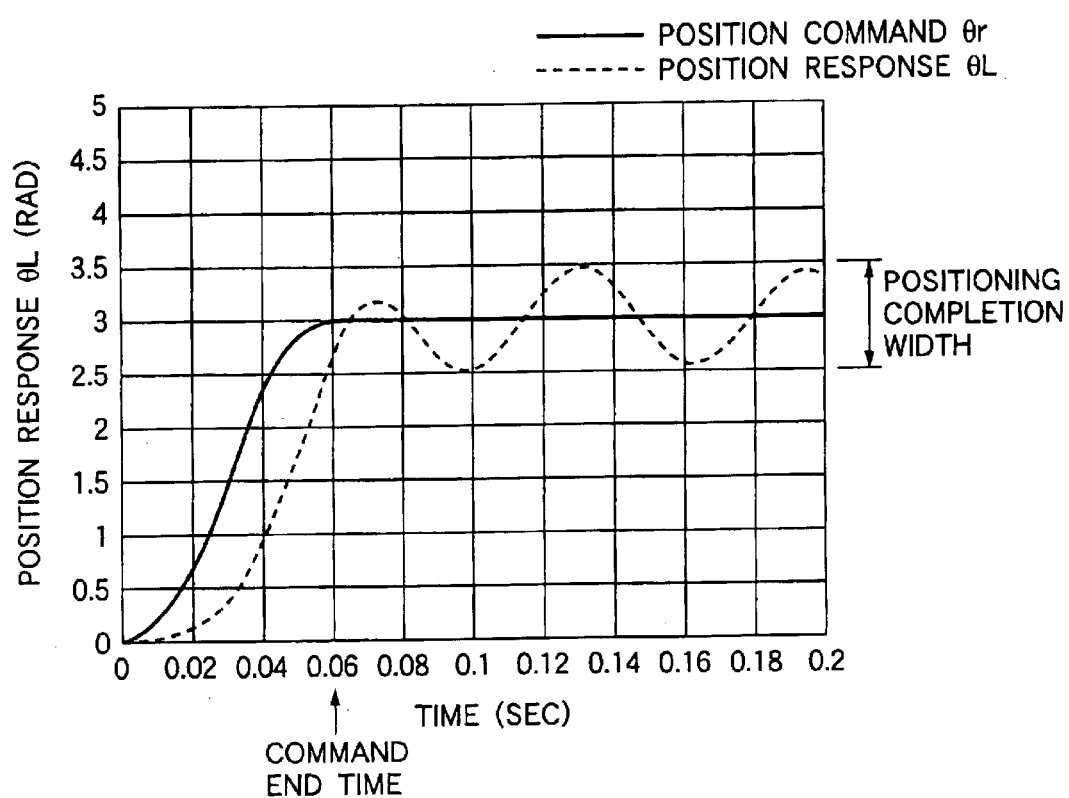
FIG. 28 is a graph showing variations of the position command and the position response in the case where optimum adjustment of the positioning state is conducted.

FIG. 28 is a graph showing the manner of variations of the position response θL in the case where the feedforward gains Kff1 and kff2=0.5 and the adjustment gain Kg=1.5.

In this case, the amplitude of the oscillation of the position response θL is smaller than the positioning completion width, and the setting time is 0.

As described above, in the above-mentioned positioning servo controller, optimum adjustment of the positioning state is conducted while adjusting the values of the adjustment gain Kg, the speed feedforward gain Kff1, and the acceleration feedforward gain Kff2.

However, the control parameters are adjusted by try and error, and hence there is a problem in that the adjustment requires a prolonged time period.

As described above, in the above-mentioned positioning servo controller, optimum adjustment of the positioning state is conducted while adjusting the adjustment gain and the feedforward gains by try and error, and hence there is a problem in that the adjustment requires a prolonged time period.

Therefore, it is an object of the invention to provide a positioning servo controller in which optimum adjustment of the positioning state can be easily conducted.

In order to solve the problems, the positioning servo controller comprises: a position controlling section which amplifies a position deviation between a position command issued from a higher-level unit and a position of a controlled object, by a position loop gain, and which outputs the amplified deviation; a first amplifying section which amplifies the value output from the position controlling section by an adjustment gain, and which outputs the amplified value; a speed feedforward controlling section which sets a value that is obtained by adding a first feedforward compensation amount to the value output from the first amplifying section, as a speed command, the first feedforward compensation amount being obtained by amplifying a differential value of the position command by a first feedforward gain; a speed controlling section which amplifies a speed deviation between the speed command and a speed of the controlled object by a speed loop gain, and which outputs the amplified deviation; a second amplifying section which amplifies the value output from the speed controlling section by the adjustment gain, and which outputs the amplified value; an acceleration feedforward section which sets a value that is obtained by adding a second feedforward compensation amount to the value output from the second amplifying section, as an acceleration command, the second feedforward compensation amount being obtained by amplifying a differential value of the first feedforward compensation amount by a second feedforward gain; an acceleration controlling section which amplifies an acceleration deviation between the acceleration command and an acceleration of the controlled object by an acceleration loop gain, and which outputs the amplified deviation as a torque command; and a torque amplifier which drives the controlled object on the basis of the torque command, values of the first feedforward gain and the second feedforward gain being values of functions in which a value of the adjustment gain is used as an argument.

In the positioning servo controller of the invention, the values of the first feedforward gain and the second feedforward gain are those of functions in which the adjustment gain is used as an argument, thereby enabling optimization of the positioning state to be conducted simply by adjusting the adjustment gain. Therefore, optimum adjustment of the positioning state can be easily conducted.

Next, a positioning servo controller of an embodiment of the invention will be described in detail with reference to the drawings.

Figures 29A, 29B:
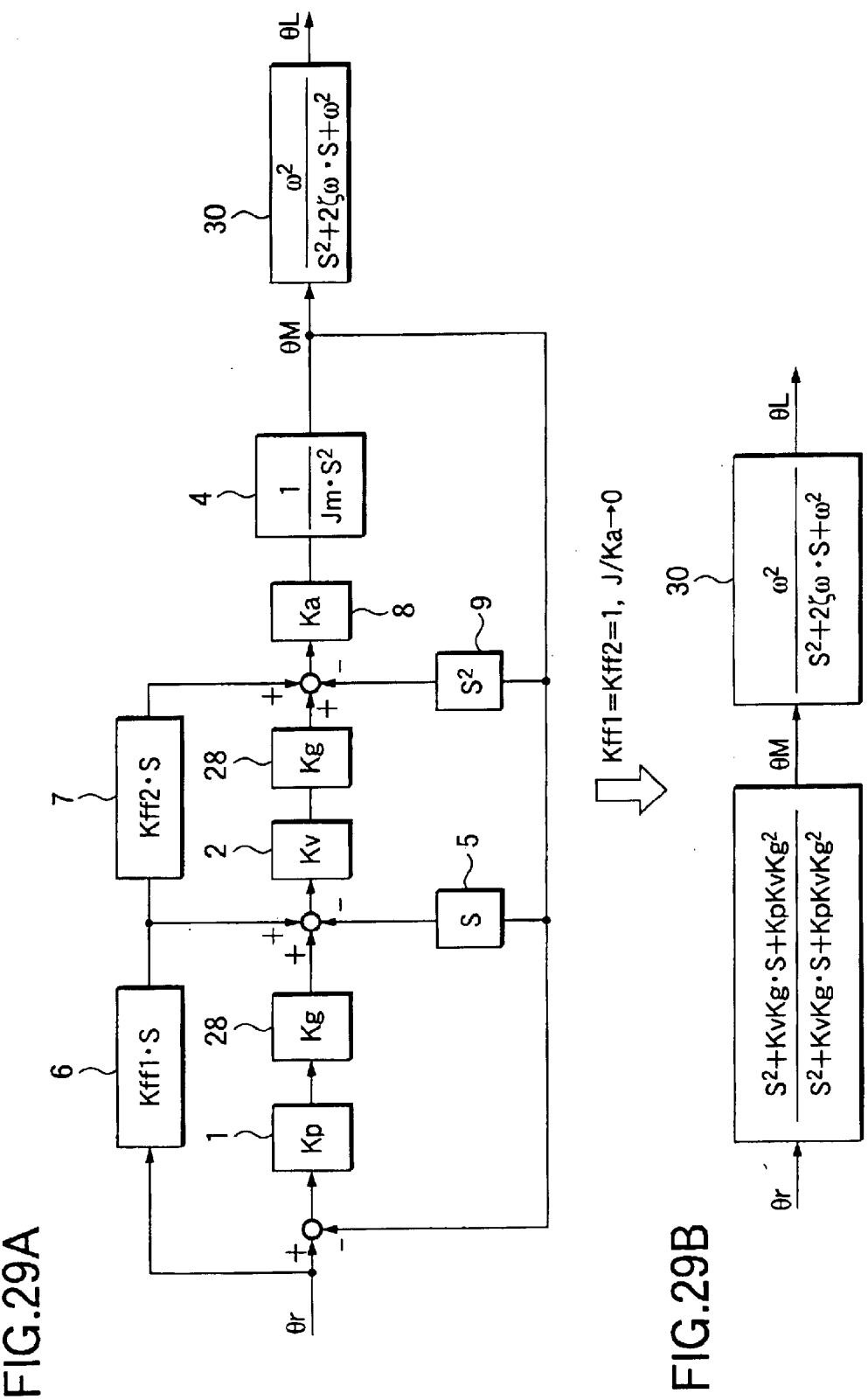
FIGS. 29($a$) and 29($b$) are the control block diagrams showing the configuration of a positioning servo controller of a fourth embodiment.
Figure 30:
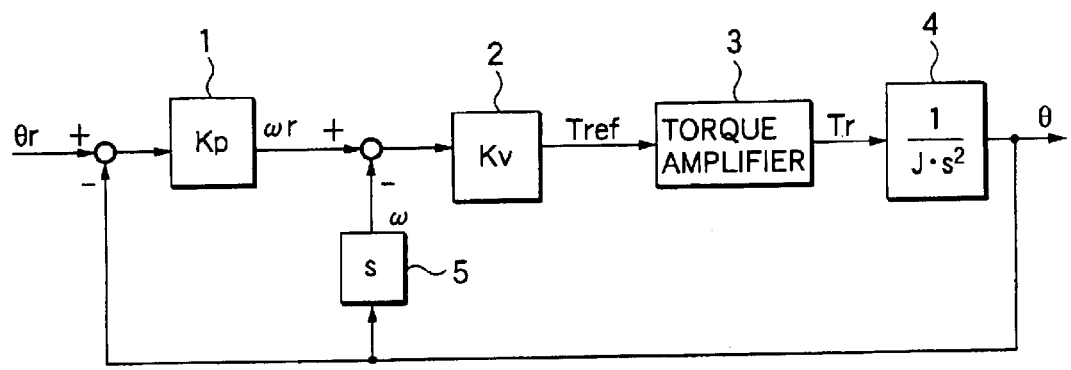
FIG. 30 is a control block diagram showing the configuration of a conventional positioning servo controller.
Figure 31A:
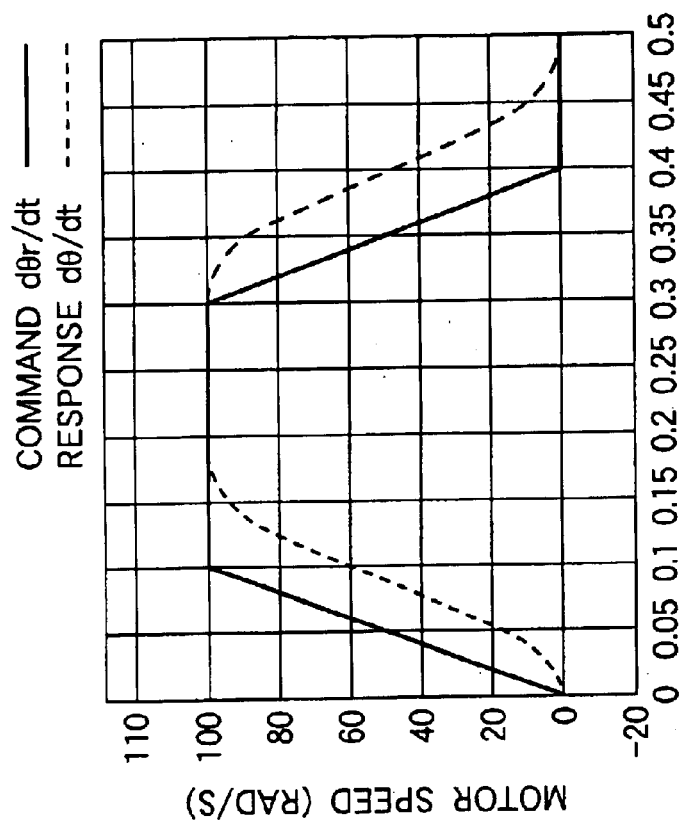
FIGS. 31($a$) and 31($b$) are the graphes showing the operation of the conventional positioning servo controller.
Figure 31B:
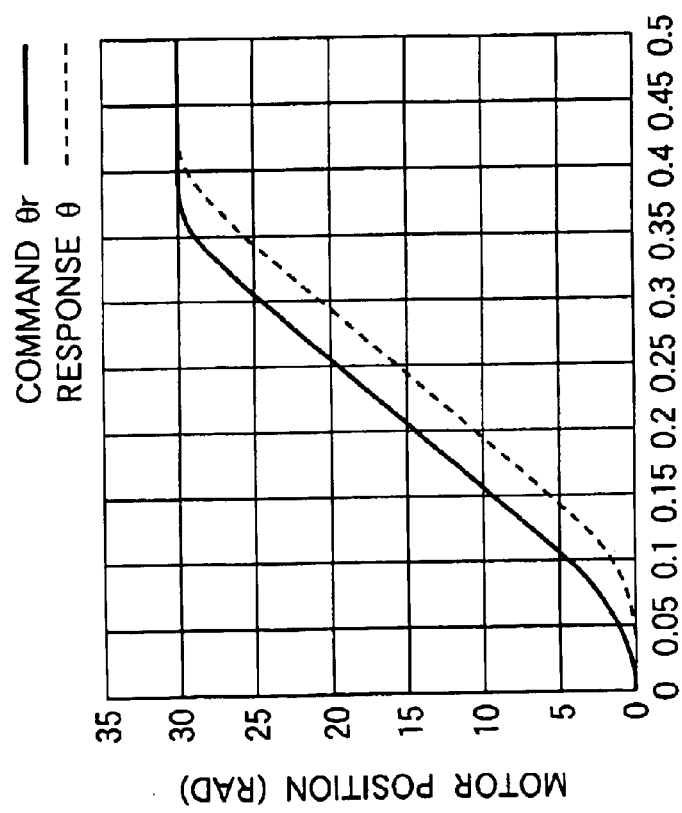

FIGS. 29(a) and 29(b) are the control block diagram showing the configuration of the positioning servo controller of the embodiment. The positioning servo controller of the embodiment is different from the positioning servo controller of FIG. 21 in that a speed feedforward controller 12 and an acceleration feedforward controller 13 are disposed in place of the speed feedforward controller 6 and the acceleration feedforward controller 7.

The feedforward controllers 12 and 13 conduct a feedforward control by using the feedforward gains Kff1 and kff2. The values of the feedforward gains Kff1 and kff2 are those of monotone increasing functions K1(Kg) and K2(Kg) indicated by expressions (28) and (29) in which the adjustment gain Kg is used as an argument.

$$Kff1 = K1(Kg) \tag{28}$$

$$Kff2 = K2(Kg) \tag{29}$$

where $(Kg - Kg\ min)/(Kg\ max - Kg\ min)(Kg\ min \leq Kg \leq g\ max)$
$K1 = 1 (Kg > Kg\ max)$ $(Kg - Kg\ min)/(Kg\ max - Kg\ min)(Kg\ min \leq Kg \leq g\ max)$
$K2 = 1 (Kg > Kg\ max)$ In the expressions, Kg min and Kg max are predetermined values which satisfy Kg min<Kg max, and Kg min is the minimum value of Kg.

In the positioning servo controller of Embodiment 4, even when the mechanical system has low rigidity and an oscillation of a large amplitude occurs in the position response θL as shown in FIG. 25, also the values of the feedforward gains Kff1 and kff2 can be simultaneously changed by changing the value of the adjustment gain Kg. Therefore, the positioning state of the mechanical system can be easily adjusted to the optimum state such as shown in FIGS. 23(*a*) and 23(*b*), simply by adjusting the adjustment gain Kg.

In the positioning servo controller of Embodiment 4, the functions K1 and K2 of the feedforward gains are monotone increasing functions. The scope of the invention is not restricted to this. The functions K1 and K2 of the feedforward gains may be curves as far as they are monotone increasing functions.

As described above, in the positioning servo controller of the invention, the values of the feedforward gains are those of functions in which the adjustment gain is used as an argument, so that, in adjustment of the positioning state of the position response, it is not required to separately adjust a plurality of control parameters. Therefore, optimum adjustment of the positioning state of a mechanical system can be easily conducted.

INDUSTRIAL APPLICABILITY

As described above, the positioning servo controller of the first invention comprises the acceleration controller which outputs the value that is obtained by amplifying the acceleration deviation between the acceleration command and the actual acceleration of the motor by the acceleration loop gain, as the torque command. Even when the inertia of the motor contained in the coefficient of the transfer function in which the position command is an input and the position response is an output is unknown, therefore, the value of the acceleration loop gain in the transfer function is a denominator of the inertia of the motor. Consequently, an influence of the inertia of the motor on the position response can be made negligible by setting the value of the acceleration loop gain to an adequate one. In the positioning servo controller of the invention, therefore, a satisfactory control response can be obtained.

According to the second invention, the response characteristic can be adjusted simply by adjusting one parameter, and hence the effect that a requested response characteristic can be easily realized is attained.

According to the third invention 3, both the gains of the feedback and feedforward control systems can be adjusted simply by adjusting one parameter, to adjust the response waveform, and hence it is possible to attain an effect that a requested response characteristic can be easily realized even in the case of adjustment of the disturbance response.

In the positioning servo controller of the fourth invention, the values of the feedforward gains are those of functions in which the adjustment gain is used as an argument, so that, in adjustment of the positioning state of the position response, it is not required to separately adjust a plurality of control parameters. Therefore, optimum adjustment of the positioning state of a mechanical system can be easily conducted.

What is claimed is:

1. A positioning servo controller comprising:
   a position controlling section which amplifies a position deviation between a position command issued from a higher-level unit and a position of a controlled object by a position loop gain, and which outputs the amplified deviation;
   a speed feedforward controlling section which sets a value that is obtained by adding a first feedforward compensation amount to the value output from said position controlling section, as a speed command, the first feedforward compensation amount being obtained by amplifying a differential value of the position command by a first feedforward gain;
   a speed controlling section which amplifies a speed deviation between the speed command and a speed of said controlled object by a speed loop gain, and which outputs the amplified deviation;
   an acceleration feedforward controlling section which sets a value that is obtained by adding a second feedforward compensation amount to the value output from said speed controlling section, as an acceleration command, the second feedforward compensation amount being obtained by amplifying a differential value of the first feedforward compensation amount by a second feedforward gain;
   an acceleration controlling section which amplifies an acceleration deviation between the acceleration command and an acceleration of said controlled object by an acceleration loop gain, and which outputs the amplified deviation as a torque command; and
   a torque amplifier which drives said controlled object on the basis of the torque command.

2. A positioning servo controller comprising:
   a position controlling section which amplifies a position deviation between a position command issued from a higher-level unit and a position of a controlled object by a position loop gain, and which outputs the amplified deviation;
   a first amplifying section which amplifies the value output from said position controlling section by an adjustment gain, and which outputs the amplified value as a speed command;
   a differentiating section which differentiates the position of said controlled object to obtain a speed of said controlled object;
   a speed controlling section which amplifies a speed deviation between the speed command and the speed of said controlled object obtained by said differentiating section, by a speed loop gain, and which outputs the amplified deviation;
   a second amplifying section which amplifies the value output from said speed controlling section by the adjustment gain, and which outputs the amplified value as a torque command; and
   a torque amplifier which drives said controlled object on the basis of the torque command.

3. A positioning servo controller comprising:
   a position controlling section which amplifies a position deviation between a position command issued from a higher-level unit and a position of a controlled object by a position loop gain, and which outputs the amplified deviation;
   a first amplifying section which amplifies the value output from said position controlling section by an adjustment gain, and which outputs the amplified value as a speed command;
   a differentiating section which differentiates the position of said controlled object to obtain a speed of said controlled object;
   an integrating section which integrates a speed deviation between the speed command and the speed of said controlled object that is obtained by said differentiating section, and which outputs a value that is obtained by multiplying an integral value with a speed loop integral gain;
   a second amplifying section which amplifies the value output from said integrating section by the adjustment gain, and which outputs the amplified value;

a speed controlling section which amplifies a value that is obtained by adding the value output from said second amplifying section to a speed deviation between the speed command and the speed of said controlled object obtained by said differentiating section, by a speed loop gain, and which outputs the amplified deviation;

a third amplifying section which amplifies the value output from said speed controlling section by the adjustment gain, and which outputs the amplified value as a torque command; and a torque amplifier which drives said controlled object on the basis of the torque command.

4. A positioning servo controller comprising:

a position controlling section which amplifies a position deviation between a position command issued from a higher-level unit and a position of a controlled object by a position loop gain, and which outputs the amplified deviation;

a first amplifying section which amplifies the value output from said position controlling section by an adjustment gain, and which outputs the amplified value as a speed command;

a differentiating section which differentiates the position of said controlled object to obtain a speed of said controlled object;

an integrating section which integrates a speed deviation between the speed command and the speed of said controlled object that is obtained by said differentiating section, and which outputs a value that is obtained by multiplying an integral value with a speed loop integral gain;

a second amplifying section which amplifies the value output from said integrating section by the adjustment gain, and which outputs the amplified value;

a speed controlling section which amplifies a deviation between the value output from said second amplifying section and the speed of said controlled object by a speed loop gain, and which outputs the amplified deviation;

a third amplifying section which amplifies the value output from said speed controlling section by the adjustment gain, and which outputs the amplified value as a torque command; and a torque amplifier which drives said controlled object on the basis of the torque command.

5. A positioning servo controller comprising:

a position controlling section which amplifies a position deviation between a position command issued from a higher-level unit and a position of a controlled object, by a proportional gain, and which outputs the amplified deviation;

a first amplifying section which amplifies the value output from said position controlling section by a value that is obtained by squaring an adjustment gain, and which outputs the amplified value;

a differentiating section which differentiates the position deviation between the position command and said controlled object;

a speed controlling section which amplifies a value obtained by said differentiating section, by a differential gain, and which outputs the amplified value;

a second amplifying section which amplifies the value output from said speed controlling section by the adjustment gain, and which outputs the amplified value;

a feedforward controlling section which outputs a value that is obtained by adding a value obtained by amplifying a value obtained by second-order differentiation of the position command, by a first feedforward gain, to a value obtained by amplifying a value obtained by differentiating the position command, by a second feedforward gain and the adjustment gain; and a torque amplifier which sets a value obtained by adding together the values output from said first and second amplifying sections and said feedforward section, as a torque command, and which drives said controlled object on the basis of the torque command.

6. A positioning servo controller comprising:

a position controlling section which amplifies a position deviation between a position command issued from a higher-level unit and a position of a controlled object, by a proportional gain, and which outputs the amplified deviation;

a first amplifying section which amplifies the value output from said position controlling section by a value that is obtained by squaring an adjustment gain, and which outputs the amplified value;

a differentiating section which differentiates the position deviation between the position command and said controlled object;

a speed controlling section which amplifies a value obtained by said differentiating section, by a differential gain, and which outputs the amplified value;

a second amplifying section which amplifies the value output from said speed controlling section by the adjustment gain, and which outputs the amplified value;

an integrating section which integrates the position deviation between the position command and said controlled object;

an integration controlling section which amplifies a value obtained by said integrating section, by an integral gain, and which outputs the amplitude value;

a third amplifying section which amplifies the value output from said integration controlling section, by a value that is obtained by cubing the adjustment gain, and which outputs the amplified value;

a feedforward controlling section which outputs a value that is obtained by adding together a value obtained by amplifying a value obtained by second-order differentiation of the position command, by a first feedforward gain, a value obtained by amplifying a value obtained by differentiating the position command, by a second feedforward gain and the adjustment gain, and a value obtained by amplifying the position command by a third feedforward gain and a value obtained by squaring the adjustment gain; and a torque amplifier which sets a value obtained by adding together the values output from said first, second, and third amplifying sections and said feedforward section, as a torque command, and which drives said controlled object on the basis of the torque command.

7. A positioning servo controller comprising:

a position controlling section which amplifies a position deviation between a position command issued from a higher-level unit and a position of a controlled object, by a proportional gain, and which outputs the amplified deviation;

a first amplifying section which amplifies the value output from said position controlling section by a value that is obtained by squaring an adjustment gain, and which outputs the amplified value;

a differentiating section which differentiates the position deviation between the position command and said controlled object;

a speed controlling section which amplifies a value obtained by said differentiating section, by a differential gain, and which outputs the amplified value;

a second amplifying section which amplifies the value output from said speed controlling section by the adjustment gain, and which outputs the amplified value;

an integrating section which integrates the position deviation between the position command and said controlled object;

an integration controlling section which amplifies a value obtained by said integrating section, by an integral gain, and which outputs the amplitude value;

a third amplifying section which amplifies a value output from said integration controlling section, by a value that is obtained by cubing the adjustment gain, and which outputs the amplified value;

a second-order differentiating section which performs second-order differentiation on the position deviation between the position command and said controlled object;

an acceleration controlling section which amplifies a value obtained by said second-order differentiating section, by an acceleration gain, and which outputs the amplified value;

a feedforward controlling section which outputs a value that is obtained by adding together a value obtained by amplifying a value obtained by second-order differentiation of the position command, by a first feedforward gain, a value obtained by amplifying a value obtained by differentiating the position command, by a second feedforward gain and the adjustment gain, and a value obtained by amplifying the position command by a third feedforward gain and a value obtained by squaring the adjustment gain; and a torque amplifier which sets a value obtained by adding together the values output from said first, second, and third amplifying sections, said acceleration controlling section, and said feedforward section, as a torque command, and which drives said controlled object on the basis of the torque command.

8. A positioning servo controller comprising:

a position controlling section which amplifies a position deviation between a position command issued from a higher-level unit and a position of a controlled object, by a position loop gain, and which outputs the amplified deviation;

a first amplifying section which amplifies the value output from said position controlling section by an adjustment gain, and which outputs the amplified value;

a speed feedforward controlling section which sets a value that is obtained by adding a first feedforward compensation amount to the value output from said first amplifying section, as a speed command, the first feedforward compensation amount being obtained by amplifying a differential value of the position command by a first feedforward gain;

a speed controlling section which amplifies a speed deviation between the speed command and a speed of said controlled object by a speed loop gain, and which outputs the amplified deviation;

a second amplifying section which amplifies the value output from said speed controlling section by the adjustment gain, and which outputs the amplified value;

an acceleration feedforward section which sets a value that is obtained by adding a second feedforward compensation amount to the value output from said second amplifying section, as an acceleration command, the second feedforward compensation amount being obtained by amplifying a differential value of the first feedforward compensation amount by a second feedforward gain;

an acceleration controlling section which amplifies an acceleration deviation between the acceleration command and an acceleration of said controlled object by an acceleration loop gain, and which outputs the amplified deviation as a torque command; and a torque amplifier which drives said controlled object on the basis of the torque command, values of the first feedforward gain and the second feedforward gain being values of functions in which a value of the adjustment gain is used as an argument.

* * * * *